INVENTOR:
CHARLES F. BALL
BY John F. Schmidt
ATTORNEY

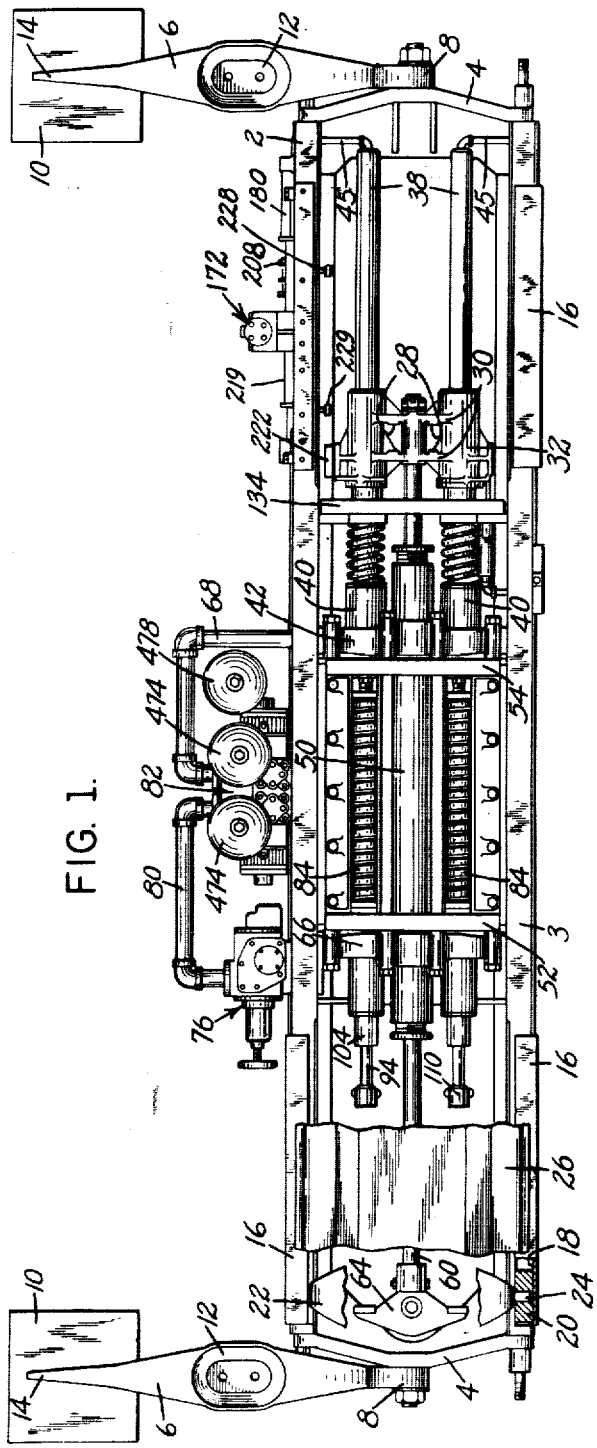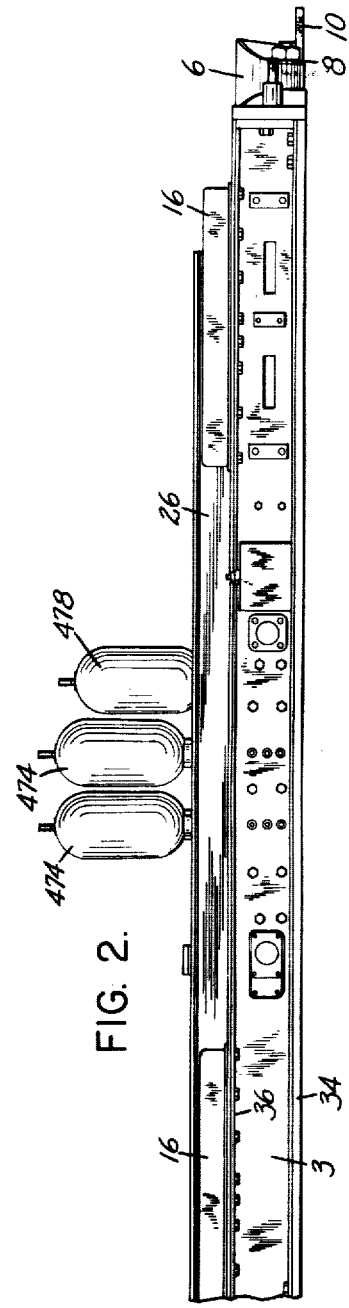
FIG. 1.
FIG. 2.
INVENTOR:
CHARLES F. BALL
BY
John F. Schmidt
ATTORNEY

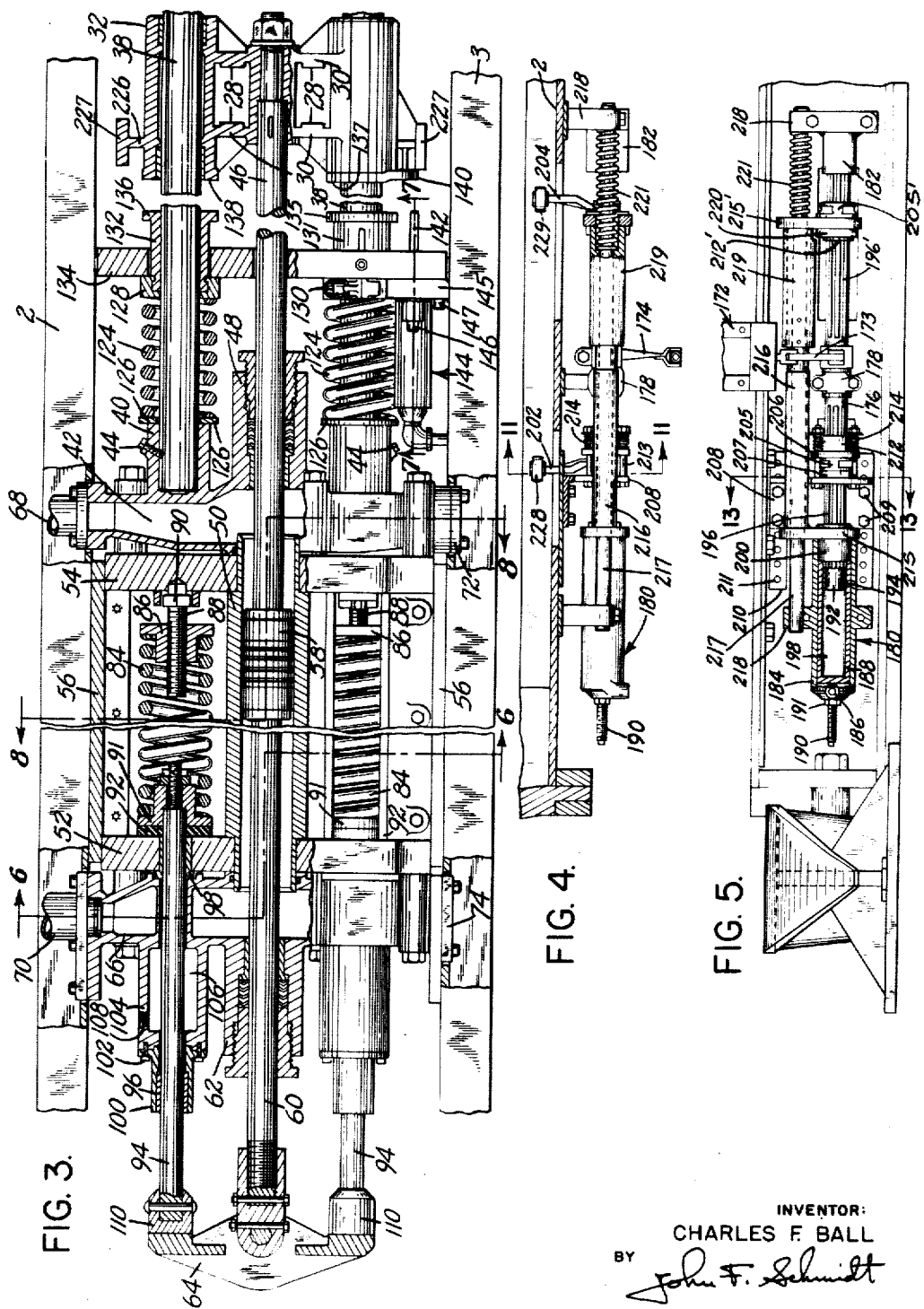

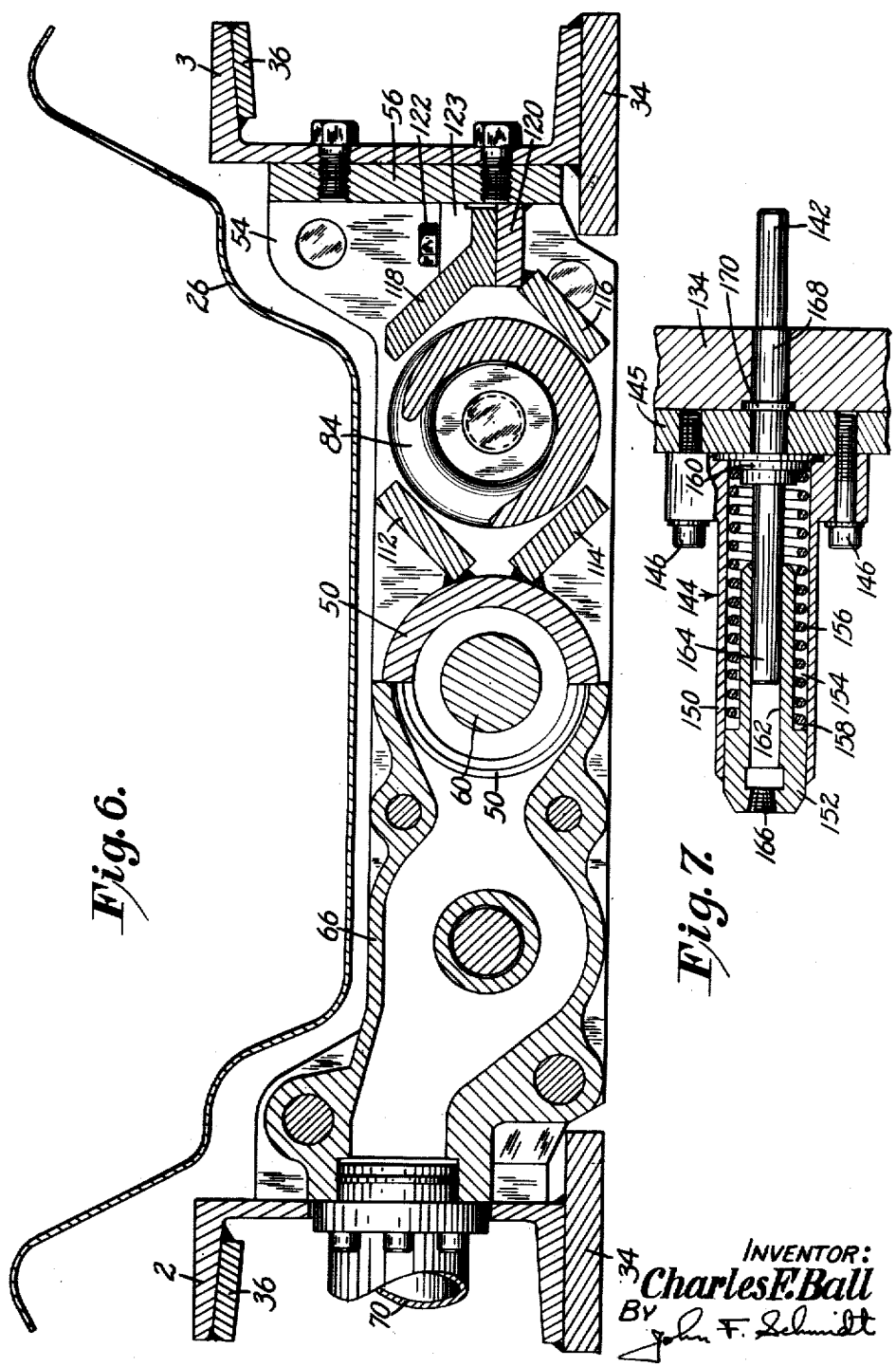

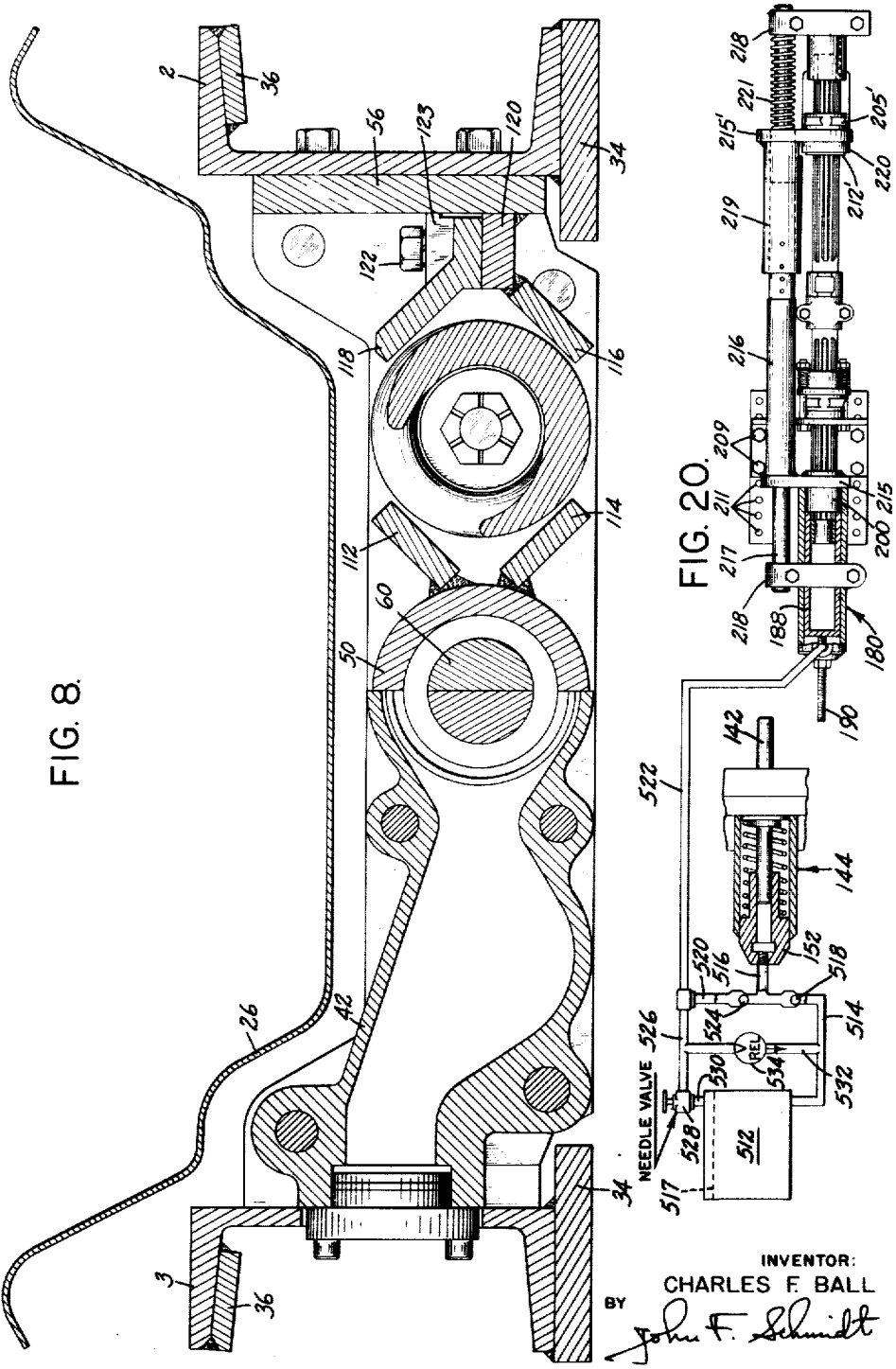

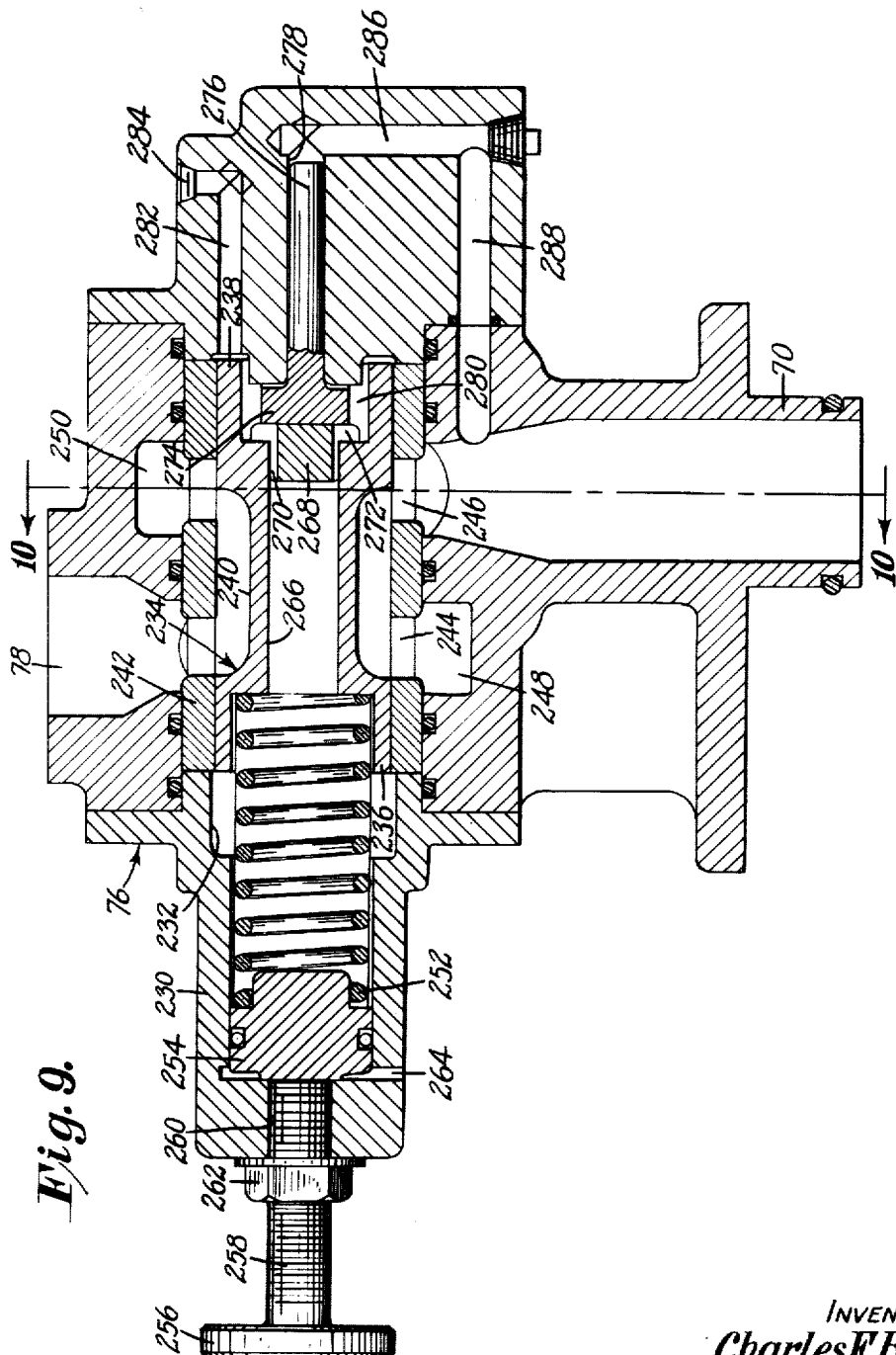

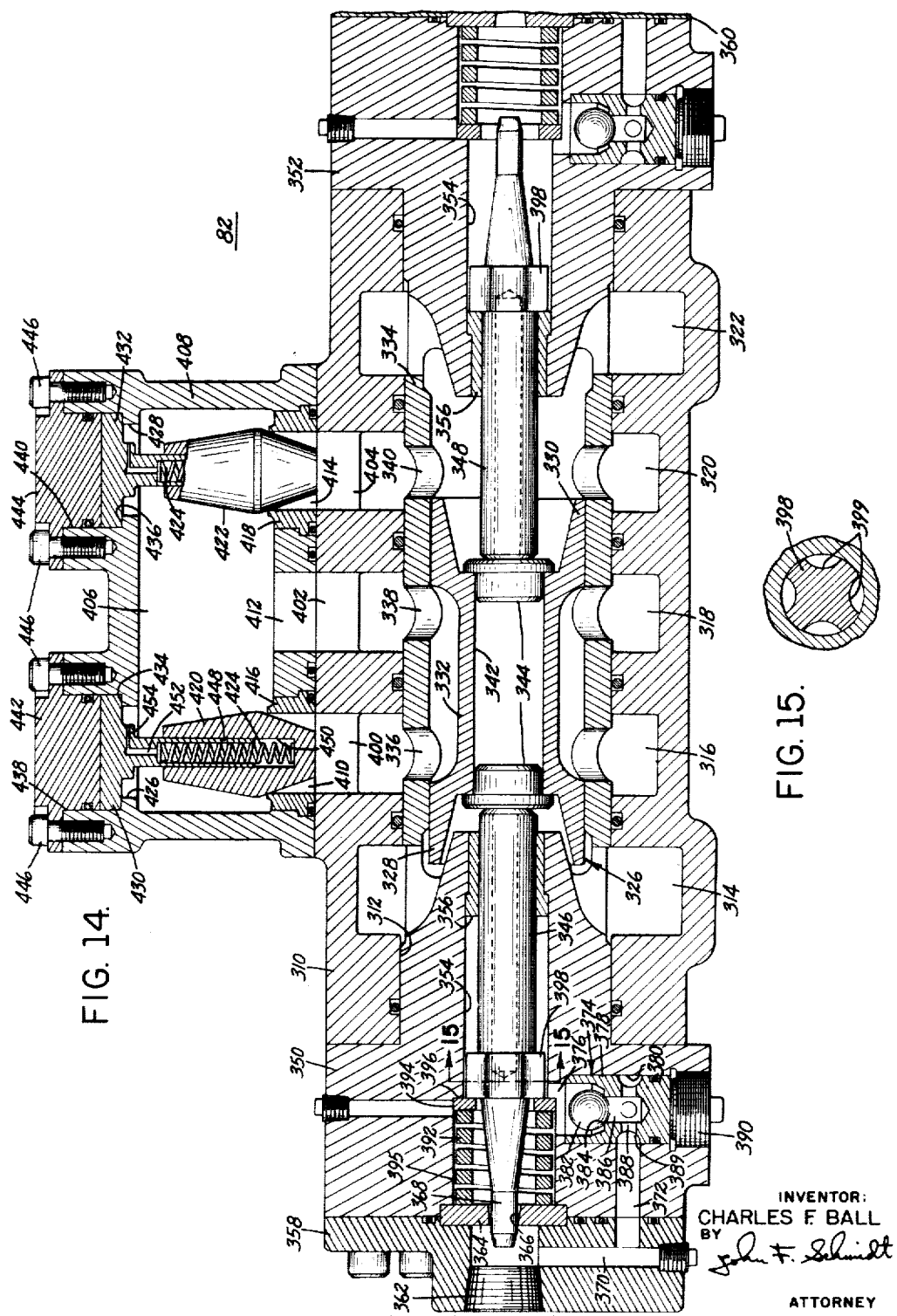

Aug. 13, 1957

C. F. BALL 2,802,336

FLUID MOTOR DRIVEN SHAKER CONVEYOR

Filed July 23, 1953

INVENTOR:
Charles F. Ball
BY
John F. Schmidt
ATTORNEY

Aug. 13, 1957   C. F. BALL   2,802,336
FLUID MOTOR DRIVEN SHAKER CONVEYOR
Filed July 23, 1953   13 Sheets-Sheet 10

INVENTOR:
Charles F. Ball
By John F. Schmidt
ATTORNEY

Aug. 13, 1957 C. F. BALL 2,802,336
FLUID MOTOR DRIVEN SHAKER CONVEYOR
Filed July 23, 1953 13 Sheets-Sheet 11
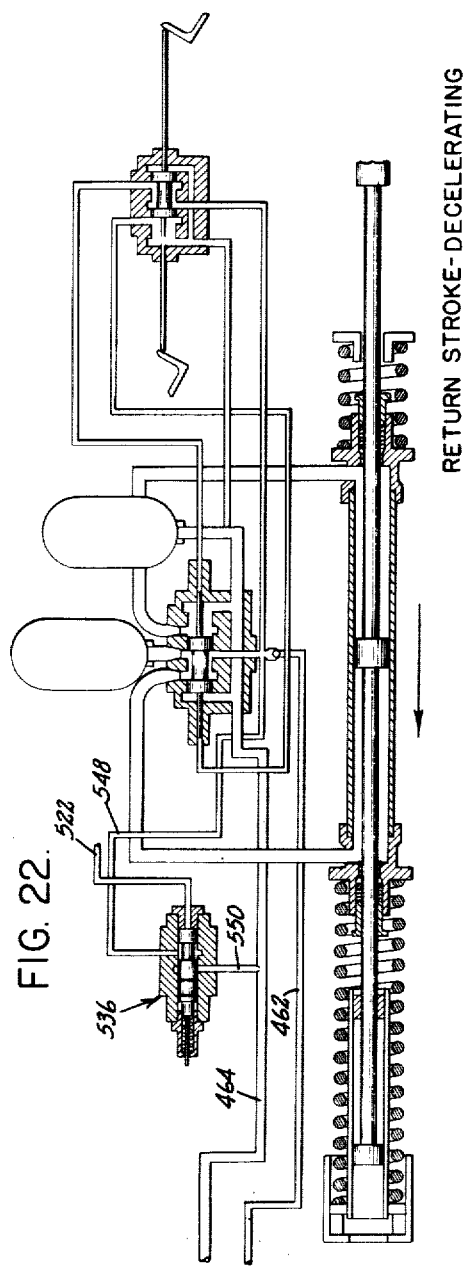
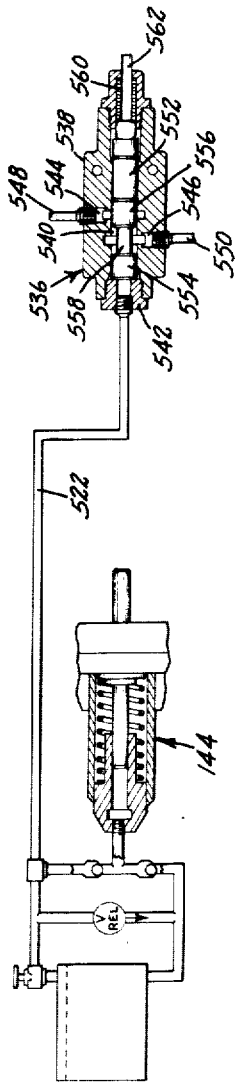
INVENTOR:
CHARLES F. BALL
BY
*John F. Schmidt*
ATTORNEY Aug. 13, 1957     C. F. BALL     2,802,336
FLUID MOTOR DRIVEN SHAKER CONVEYOR
Filed July 23, 1953     13 Sheets—Sheet 12

INVENTOR:
CHARLES F. BALL
BY
ATTORNEY

Aug. 13, 1957  C. F. BALL  2,802,336
FLUID MOTOR DRIVEN SHAKER CONVEYOR
Filed July 23, 1953  13 Sheets-Sheet 13

INVENTOR:
CHARLES F. BALL
BY
ATTORNEY

United States Patent Office 2,802,336
Patented Aug. 13, 1957

2,802,336

FLUID MOTOR DRIVEN SHAKER CONVEYOR

Charles F. Ball, Franklin, Pa., assignor to Joy Manufacturing Company, Pittsburgh, Pa., a corporation of Pennsylvania Application July 23, 1953, Serial No. 369,921

30 Claims. (Cl. 60—51)

This invention relates to a fluid motor driven shaker conveyor, particularly to a shaker conveyor driven by hydraulic power.

Shaker conveyors present designers with peculiar problems because of their sharply varying power requirements. While the material conveyed is being moved forward, care must be exercised not to accelerate the carrier element so fast that it slides out from under the material. At the same time, however, a high acceleration is desirable in order that the conveyed material may have reached a high velocity before reversal of the carrier element is initiated.

In order that the conveyed material may continue to move in the desired direction, the carrier element should, after reaching peak velocity, be stopped as rapidly as possible. This calls for a maximum deceleration of the carrier element, sliding the carrier under the conveyed material. What happens is that momentum keeps the conveyed material in motion while the carrier stops abruptly; then, before the conveyed material can stop, the carrier is reversed with tremendous acceleration, moving back to its starting point, and the cycle begins all over again.

The power requirements for such accelerations are of course enormous, and the cost of a direct application of sufficient power from a primary source to operate a large conveyor is prohibitive. I have found that, with a conveyor drive mechanism made according to this invention, a peak of 70 hydraulic horsepower may be attained with a pump drive motor which rarely delivers over 25 hydraulic horsepower. This remarkable saving in power put into the system is made possible by the use of a conveyor of large mass, and by utilizing the inertia of the large mass to store up energy for the rapid acceleration needed. Conversely, energy storing means are used to stop the large reciprocating mass quickly and smoothly.

The advantages of the invention are perhaps more readily realized when viewed from the standpoint of saving in equipment. To accomplish the 70 hydraulic horsepower referred to by conventional means, an electric motor of 100 horsepower would probably be required, whereas with my invention, an electric motor of 40 horsepower is more than adequate. Furthermore, a conventional hydraulic drive would require a pump having a capacity of approximately 120 gallons per minute; with my invention, a pump having a capacity of 40 G. P. M. provides the necessary volume which at times reaches an instantaneous value near 120 G. P. M. Moreover, in apparatus embodying my invention, the 40 G. P. M. pump delivers hydraulic fluid at a constant or nearly constant rate, whereas a conventional drive would require a pump which could vary its output from nothing to 120 G. P. M. something like 100 times per minute, or would continuously discharge excess fluid except at moments of peak demand. The alternatives to appartus made according to my invention are almost prohibitively complicated and expensive or inefficient, and are therefore of exceedingly doubtful practicability.

In apparatus made according to this invention, the reciprocating mechanism makes approximately the same number of strokes per minute whether the conveyor is loaded or unloaded (assuming fixed pump output and valve timing). The big difference between these two operating conditions appears in the pressure of the hydraulic fluid as supplied to the hydraulic motor. In passing quickly from a loaded to an unloaded conveyor, the high pressure referred to becomes a problem because it tends to cause temporary overspeeding and overtravel of the reciprocating parts.

It is accordingly an object of this invention to provide a much improved shaker conveyor drive of the hydraulic type which utilizes the reciprocating mass of the conveyor to provide directly applied peak power far in excess of the maximum power supplied, and which is self-regulating throughout varying load conditions.

The stated and other objects are accomplished in a shaker conveyor of large mass, reciprocated by a hydraulic motor supplied with fluid through a reversing valve the controls of which are operated so as to reverse the valve before the end of each stroke of the shaker mechanism, whereby the motor discharges fluid against a high pressure into energy storing means, thus abruptly but smoothly stopping the large mass and providing the margin of power necessary for rapid acceleration of the mass to start the next stroke. Other energy storing means, such as springs, aid in the achievement of the objects. Overtravel of the conveyor (when running light or for some other reason) can if desired be used to change the point of valve reversal or to apply other corrective measures.

The stated and other objects are moreover accomplished in a shaker conveyor in which the fluid is supplied to the cylinder through a reversing valve which communicates with high and low pressure accumulators, thus obviating the need for a large volume of hydraulic fluid flow between the source of supply of fluid under pressure and the reversing valve, and thus making it possible to locate the pump or other source of fluid under pressure remote from the shaker mechanism itself, with small capacity hydraulic lines connecting the source and the shaker mechanism.

In the drawings:

Fig. 1 is a top plan view of a shaker conveyor embodying the invention, but not showing the fluid tank, the pump, and the connections therefrom to the shaker conveyor itself.

Fig. 2 is a side elevation view of the apparatus shown in Fig. 1.

Fig. 3 is another top plan view on a larger scale of a portion of the apparatus shown in Fig. 1, with parts broken away and in section to show details of construction.

Fig. 4 is a top plan view, with parts broken away and in section, of a portion of the mechanism showing certain details of the positionable trip mechanism which actuates the pilot valve which in turn controls the reversing valve.

Fig. 5 is a side elevation view of the detail shown in Fig. 4, again with parts broken away and in section to show still further details.

Fig. 6 is a view in section substantially on line 6—6 of Fig. 3.

Fig. 7 is a view in section substantially on line 7—7 of Fig. 3.

Fig. 8 is a view in section substantially on line 8—8 of Fig. 3.

Fig. 9 is a view in section through the axis of the valve element and through the axes of the entrance and discharge ports of the pressure regulating valve, being a section substantially on line 9—9 of Fig. 10.

Fig. 14 is a view in section substantially on line 14—14 of Fig. 12, on a larger scale than Fig. 12.

Fig. 15 is a view in section on line 15—15 of Fig. 14.

Fig. 16 is a schematic view depicting the apparatus in diagrammatic form and showing the main working piston accelerating in a working stroke.

Fig. 17 is a view similar to Fig. 16, but showing the various valves in position for the decelerating portion of the working stroke of the main drive piston.

Fig. 20 is a schematic view showing the hydraulic circuit for that portion of the apparatus which controls the positionable trip mechanism to govern timing of the actuation of the pilot valve.

Fig. 21 is a view similar to Fig. 20, but showing the hydraulic circuit of another embodiment of the invention.

Fig. 22 is a view similar to Fig. 19, but being a schematic view of the embodiment for which the hydraulic circuit is shown in Fig. 21.

Figure 10:
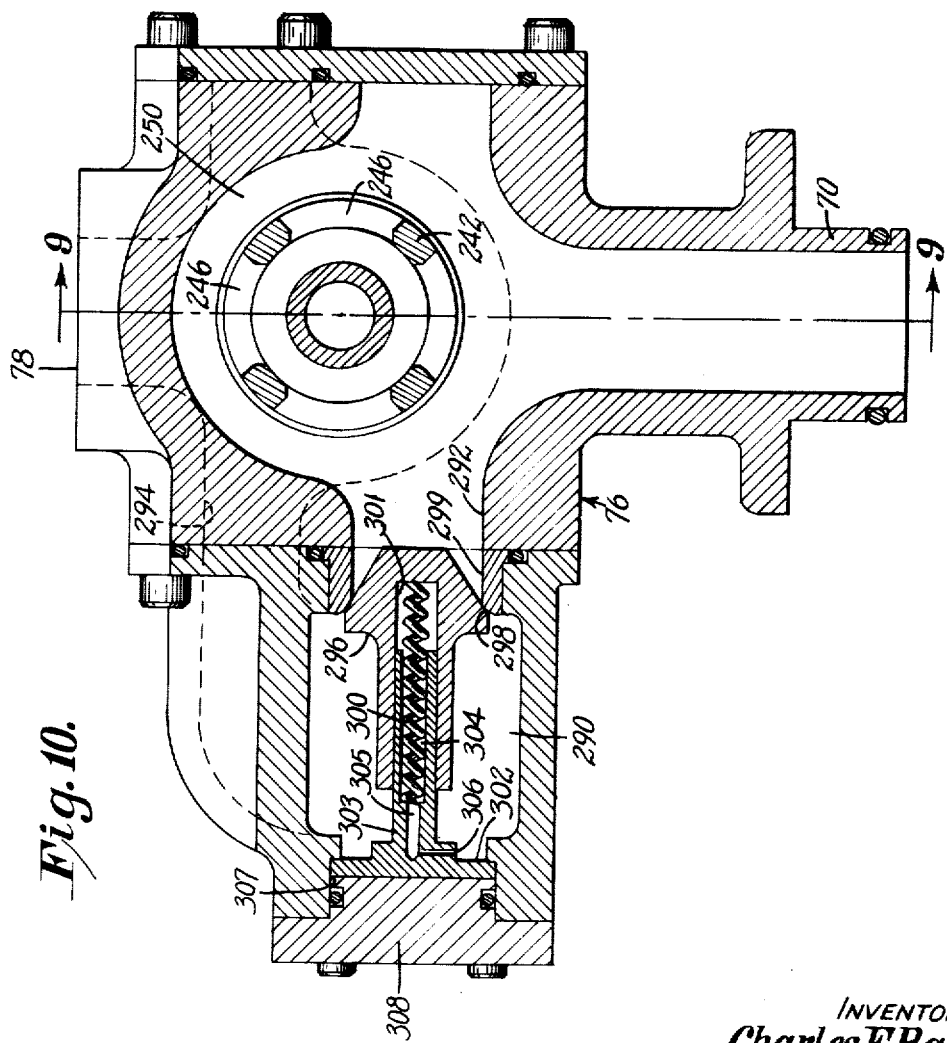
Fig. 10 is a view in section substantially on line 10—10 of Fig. 9.

Referring now in detail to the drawings, the mechanism is shown as being supported by a pair of side rails 2 and 3 secured at their ends by any suitable cross members 4 and being held down against displacement due to vibration by beams 6 pivotally engaging the cross members at 8 and engaging bearing plates 10 at their other ends. The beams 6 are provided intermediate their ends with bearing surfaces 12 adapted to engage one or more roof jacks arranged to put pressure on the beams 6. If desired, the ends 14 of the beams 6 may be rigidly joined by another longitudinal member, not shown.

As will be understood by those skilled in the art, the two side rails 2 and 3 will be provided with corresponding mounting openings in order that the reversing valve, the pressure regulating valve, the positionable trip mechanism, and the necessary mechanical and hydraulic connections, can all be provided on either side of the conveyor. This arrangement is of particular interest in longwall mining. As the apparatus is seen in Fig. 1, it is arranged so that the rail 3 may be placed along the face, but the mechanism may be assembled with the aforesaid reversing valve, pressure regulating valve, positionable trip mechanism, and connections on the side rail 3 so that the other rail 2 may be placed along a mine face. In such an arrangement, it will of course be further understood that the beams 6 and bearing plates 10 will also be rearranged.

Guide rails 16 are secured to the top edge of side rails 2 and 3, a pair of opposed guide rails being located at each end of the paired side rails. The guide rail has been omitted from the upper right-hand corner of Fig. 1 in order more clearly to show the trip mechanism. Guide rails 16 are grooved longitudinally as shown at 18 (Fig. 1, lower left-hand corner). Sliding bearing blocks 20, preferably of a suitable bearing material such as bronze, are provided to slide in grooves 18. The two bearing blocks 20 in the grooves of opposed guide rails serve to hold saddles, a portion of one being shown at 22, by means of projections 24 on the saddles fitting in cooperating openings in the bearing blocks 20. A shaker pan 26 is supported on the saddle 22 and is secured thereto by any suitable means, not shown.

The saddle which rides in the guide rails at the right end of Fig. 1 is not shown in order better to be able to see the structural details of the mechanism. However, the saddle will be similar to the one shown at 22, but will in addition be provided with downward extending projections which fit between pads 28 (Fig. 3) provided on cross arms 30 of the crosshead 32. Reciprocation of crosshead 32 will thus provide the desired shaker motion of the pan 26.

As is best seen in Figs. 6 and 8, the side rails 2 and 3 may be and preferably are provided with bottom reinforcements 34 welded to the side rails and reinforcements 36 welded to the under side of the upper flanges of the channel-shaped side rails.

The crosshead 32 is slidable on rods 38 which are anchored at one end in sockets 40 provided on the hollow cross member 42. Set screws 44 hold the rods 38 against accidental withdrawal from sockets 40. At their other ends, rods 38 are provided with lubricant connections 45 (Fig. 1). The rods 38 are hollow and at one or more places along their length are provided with transverse openings (not shown) to their surfaces through which the lubricant passes to lubricate the rods for easier sliding of the crosshead 32.

The crosshead 32 is connected for reciprocation to a piston rod 46. Piston rod 46 extends through a suitably packed stuffing box 48 in the cross member 42, and into a hydraulic cylinder 50. The cylinder 50 is mounted between two cross members 52 and 54 which are in turn supported by bracket members 56. The bracket members 56 are secured to the side rails 2 and 3 in any suitable manner.

Piston rod 46 is secured to a piston 58 which is reciprocable in cylinder 50. Another piston rod 60 is secured to the opposite end of piston 58 and passes through another stuffing box 62 and carries at its outer end a T-shaped abutment 64. Piston rod 46, piston 58, and piston rod 60 are preferably integral to provide the required strength.

The stuffing box 62 is provided in a cross member 66. The cross members 42 and 66 are symmetrical on both sides of a center line passing through the piston rods and piston, and are hollow to serve as cylinder heads for the cylinder 50. In order that the reversing valve, regulating valve, connections, etc. may be mounted at either side of the shaker mechanism, the cross members or cylinder heads 42 and 66 are hollow from end to end—i. e. from one side rail to the other. As shown in the drawings, and as best seen in Fig. 3, the mechanism is assembled with the fluid connections, valves, etc. at the side shown at the top. Thus, the cylinder head 42 is connected to a conduit 68 and the cylinder head 66 is connected to a fluid connection 70. The other end of cylinder head 42 is closed by a cap 72 and the other end of cylinder head 66 is closed by a cap 74.

The fluid connection 70 is an integral part of a pressure regulating valve 76 (Figs. 1 and 9), which has another fluid connection 78 by which valve 76 is connected to a conduit 80 (Fig. 1). Conduits 68 and 80 thus connect the cylinder heads 42 and 66, respectively, to a reversing valve 82, the connection to cylinder head 66 being through the pressure regulating valve 76, as just explained.

The shaker mechanism is provided with spring means to help stop the reciprocating parts near the end of the working stroke of the piston. The spring means which thus helps to stop the reciprocating parts stores up energy and gives that energy up in accelerating the piston on its next return stroke.

More specifically, two springs 84 are disposed between the cross members 52 and 54 in a manner to be compressed as the piston nears the end of its working stroke. As is best seen in Fig. 3, one end of each spring 84 rests against a spring seat 86 which has threaded engagement with a bolt 88. The right end of each bolt 88 rests in a recess in the cross member 54 in a manner to permit rotation of bolt 88 in the recess. Each bolt 88 is provided with a head 90 of any suitable shape to receive a wrench adapted to turn the bolt 88 and thus effect an adjustment of the initial compression of its associated spring 84.

The opposite end of each spring 84 engages a spring seat 91 which bears against a rubber washer 92; seat 91 is secured to a rod 94. Rod 94 is slidable in suitable bearings 96 and 98 mounted in a bearing sleeve 100 and in the cross member 52 respectively. Bearing sleeve 100 is secured in any suitable manner as by bolts 102 to a boss 104 which is preferably integral with the cylinder head or cross member 66. The boss 104 is preferably hollow to provide a cavity 106 to serve to hold lubricant for the bearings 96 and 98. A tapped opening 108 is provided to receive a suitable connection to supply lubricant to the cavity 106. As will be well understood by those skilled in the art, the sleeve 100 and the portions of the boss 104 adjacent the rod 94 will be provided with clearance in order that the only metal having sliding contact with the rods 94 may be the metal of the bearings 96 and 98.

Each rod 94 carries at its left end a contact cap 110. The two contact caps 110 are adapted to be engaged by the ends of the T-shaped abutment 64.

In order to assure that the springs 84 will be kept in alinement during compression, they are provided with external guides. As is best seen in Figs. 6 and 8, the guides take the form of restraining bars 112, 114, 116 and 118. Bars 112 and 114 are preferably permanently secured, as for example by welding, to the cylinder 50. The bar 116 may be welded to a longitudinal strap 120 which in turn is welded to the bracket 56. The strap 120 is provided with threaded openings in order to receive bolts 122 which hold the restraining bar 118 in place, but in a manner to permit removal of the bars 118 in order to make it possible to install and remove the springs 84. Spacers 123 provide suitable seats for the heads of bolts 122.

The mechanism is also provided with resilient means to aid in stopping the reciprocating parts in the event that, on the return stroke, the piston moves beyond a predetermined limit. The resilient means accomplishing this function consists of springs 124, disposed in compression between washers 126 and spring seats 128. Washers 126 abut against the ends of sockets 40, and spring seats 128 consist preferably of two-piece collars bolted together as shown at 130 and engaging bumper sleeves 131 and 132. The bumper sleeves extend through openings in a cross member 134; the springs 124 are thus normally compressed between the sockets 40 and cross member 134.

Bumper sleeves 131 and 132 are provided at their right ends, as seen in Fig. 3, with flanges 135 and 136 respectively which are adapted to be engaged by bumper faces 137 and 138 on crosshead 32. Bumper face 137 is provided with a lobe 140 to one side of the center line of its rod 38. Lobe 140 is provided to engage a plunger 142 of a small hydraulic pump indicated generally at 144.

As is best seen in Fig. 7, pump 144 is secured to a plate 145 by bolts 146; plate 145 in turn is welded to its adjacent side rail 3, and is also secured in any suitable manner, as by bolts, one of which is shown at 147, to cross member 134. The pump housing 150 comprises a shell which is mounted in the aforesaid manner and in the left end of which there is secured a member 152 which constitutes the pump cylinder. Throughout a major portion of its length, the pump cylinder is reduced somewhat in diameter in order to provide an annular space 154 between the pump housing 150 and the cylinder. A spring 156 lies in the annular space 154, being in engagement at its one end with a shoulder 158 on cylinder 152 and being engaged at its other end by a spring seat 160 secured to the plunger 142. The left end of plunger 142 slidably engages the bore 162 of cylinder 152; thus the left end of plunger 142 constitutes a piston 164. The head of cylinder 152 is provided with a suitable tapped opening 166 in order to receive a pressure fluid connection as will be described later.

The plunger 142 preferably slides in a sleeve 168 which extends through the cross member 134 and the plate 145. The sleeve 168 is provided with a flange 170 which lies in a recess in member 134 and in engagement with the inner face of plate 145.

The positionable trip mechanism

The positioning of the reversing valve is controlled by a pilot valve 172 (Figs. 1, 16, 17, 18 and 19). The details of the pilot valve do not per se form a part of this invention and are therefore not disclosed except schematically in the operational views Figs. 16–19.

Reference will now be had to Figs. 4, 5, 13 and 20 for a detailed discussion of the positionable trip mechanism. The pilot valve 172 is connected by means of a link 173 to be actuated by a pilot valve actuator or arm 174. Arm 174 is secured in non-rotatable and non-slidable relation to a rock shaft 176. Shaft 176 is rockably mounted in a middle bearing 178, its left end (as seen in Figs. 4 and 5) supported in an expansible chamber motor indicated generally at 180, and its right end is supported in a bearing 182. Motor 180 and bearing 182 are secured to the side rails 2 in any suitable manner.

Motor 180 consists of a cylinder 184 provided with a pressure fluid connection 186. A hollow piston 188 is reciprocable in the cylinder 184 and engages at the closed end of the cylinder an adjusting screw 190 in the end of cylinder 184; a lock nut 191 holds screw 190 against accidental turning. At its other end, piston 188 receives one end of rock shaft 176. Shaft 176 is turned down at its extreme end as shown at 192, and a small sleeve bearing 194 is secured to the end 192 in any suitable manner, as for example by a press fit. The hollow piston 188 thus overlaps a part of the splined portion 196 of rock shaft 176 without being in contact therewith, having sliding contact only with the sleeve bearing 194. If desired, the chamber 198 inside the hollow piston 188 may be vented in any suitable manner, as for example by an axial hole in shaft 176 communicating with the exterior, or by grooves in the sleeve bearing 194 communicating with the grooves of the splined portion 196.

Piston 188 abuts at its open end against a collar 200. Collar 200 is splined internally to engage the splines of portion 196. Collar 200 is therefore slidable longitudinally along the rock shaft 176, but is non-rotatable with respect thereto.

Figure 13:
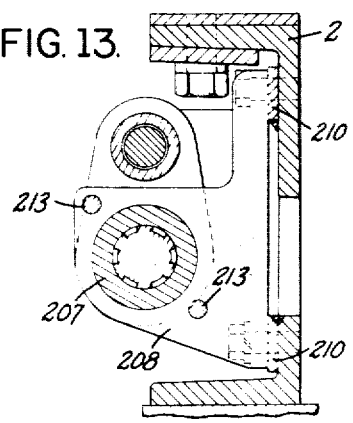
Fig. 13 is a view in section substantially on line 13—13 of Fig. 5, on a larger scale than Fig. 5.

Collar 200 is connected to control one of a pair of trip arms 202 and 204; in the embodiment shown, collar 200 controls arm 204, while arm 202 is positioned manually. Thus, arm 202 is integral with a hub 205 which is clamped between a plate 206 and a boss 207 (Figs. 4, 5, and 13). Hub 205 has internal splines which cooperate with the splined portion 196 of shaft 176, and is thus locatable axially along shaft 176 to a limited extent, but is non-rotatable with respect thereto.

The boss 207 referred to is integral with a bracket 208, which in turn is mounted on side rail 2 by means of screws 209. Preferably, spacer strips 210 (Fig. 13) are welded to rail 2, and a plurality of threaded holes 211 are provided, closely spaced, in strips 210 and rail 2, to permit a selection of locations of arm 202 along the shaft 176.

The right end 212 (as seen in Fig. 5) of hub 205 is machined to a smaller diameter than the left end to provide a shoulder against which plate 206 is held by threaded fastening means 213 passing through suitable openings in bracket 208 and plate 206. Springs 214 are preferably provided on fastening means 213 to give the mounting some resilience in the axial direction.

Returning now to collar 200 and its control of trip arm 204, it will be observed that a transverse member 215 is suitably secured to collar 200 and to a sleeve 216 which is mounted to be movable in a direction parallel to shaft 176. In the embodiment shown, sleeve 216 is slidable on a rod 217 which is secured at its ends by brackets 218, the latter being supported on side rail 2.

Another sleeve 219 is secured to the right end of sleeve 216 by means of screws (not shown because of the small scale) passing through cooperating alined openings in the two sleeves. The right end of sleeve 219 carries a transverse member 215' which engages a hub 205', hub 205' being similar to hub 205 and carrying arm 204. Transverse member 215' engages the reduced diameter end 212' of hub 205', and is clamped between the shoulder of hub 205' and a keeper ring 220 which may be held in place in any suitable manner.

As is best seen in Fig. 4, the right end of sleeve 219 is counterbored to provide a socket for one end of a spring 221, the other end of which bears against bracket 218.

Hub 205' is internally splined to cooperate with the splined portion 196' of shaft 176. Hub 205' is thus non-rotatable relative to shaft 176, and is axially movable thereon. Axial movement of the hub effects movement also, of course, of its integral arm 204.

It will be understood by those skilled in the art that sleeves 216 and 219 can be made integral. However, the embodiment shown is preferred because it provides additional adjustability of the trip arm 204.

Figure 11:
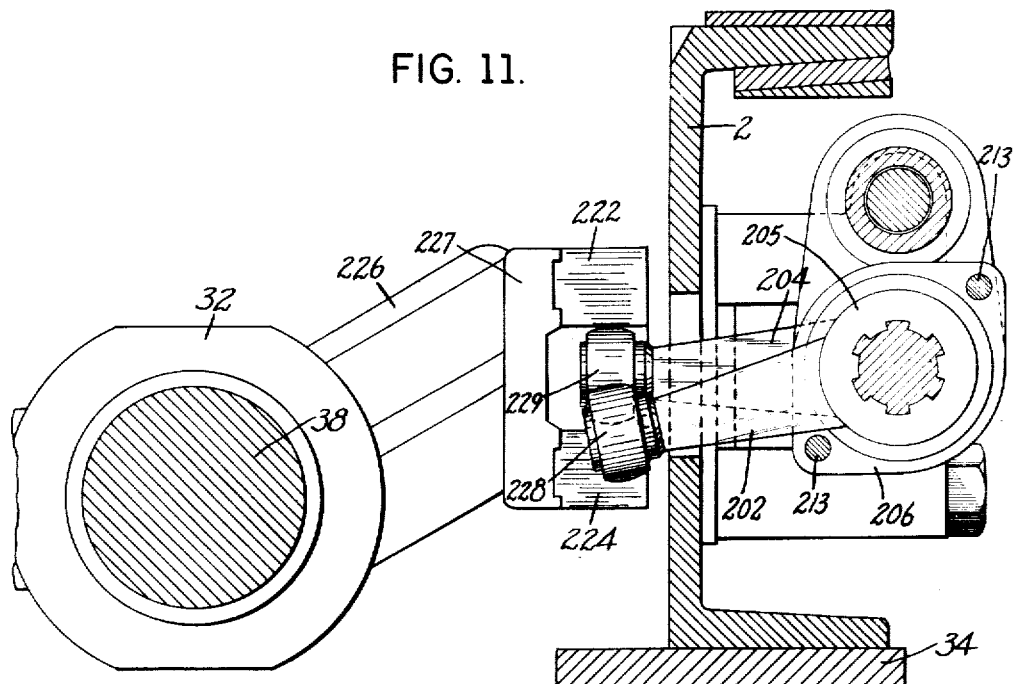
Fig. 11 is an enlarged detail sectional view, being a view in section substantially on line 11—11 of Fig. 4.

The two trip arms 202 and 204 are adapted to be shifted by cooperating cams 222 and 224 (Fig. 11) reciprocably carried by an arm 226 which is integral with crosshead 32. Arm 226 is duplicated on the other side of the crosshead, and each such arm carries a pad 227 to which the cams 222 and 224 may be secured by suitable screws; the cams will be secured to one pad or the other depending of course upon which side will carry the hydraulic apparatus. As is readily seen in Fig. 11, the two arms 202 and 204 are misalined by whatever angle is necessary to shift the pilot valve from one extreme operating position to the other. Arms 202 and 204 are preferably provided with rollers 228 and 229 respectively for engagement by cams 224 and 222.

*The pressure regulating valve*

Reference is now made to Figs. 9 and 10 for a detailed discussion of the pressure regulating valve 76. Pressure regulating valve 76 includes a valve body 230 having a substantially central bore 232 and a valve element 234. Valve element 234 is of the spool type having lands 236 and 238 and a groove 240 between the lands. The valve element may be mounted for reciprocation directly in the bore 232, but preferably a liner 242 is provided in the bore 232 to provide the bearing surface on which element 234 slides. Liner 242 is provided with two sets of slots 244 and 246. Slots 244 communicate with an annular groove 248 in the valve body and slots 246 communicate with an annular groove 250. The aforesaid fluid connection 70 communicates with groove 250 and the fluid connection 78 communicates with groove 248.

At one end, bore 232 carries a spring 252 compressed between a movable spring seat 254 and one end of element 234. Spring seat 254 is adjustable in the left end of bore 232 by means of a hand wheel 256 integral with a screw 258 which has engagement with a threaded opening 260 in the end of the valve body. A lock nut 262 is preferably provided to hold the screw 258 against accidental displacement. The left end of bore 232 is preferably ported to the atmosphere by means of a passage 264 through the valve body.

In order that the valve element may be as light as possible, it is made hollow, the hollow providing a substantially circular bore 266. At its end opposite the end engaging the spring 252, the valve element is provided with a bearing member 268 having a press fit relationship with the bore 266. The bearing member is provided with means to permit communication through the bore 266 at the locus of the bearing member 268, those means comprising grooves 270; in other words, the grooves 270 insure that the bearing member 268 shall not seal the passage provided by the bore 266.

The bearing member 268 is provided with a head or flange 272 which permanently locates it in the bore 266 and which is also adapted to engage the head 274 of a control piston 276. Piston 276 is reciprocable in a second bore 278 in the valve body which is in communication with the bore 232.

As is best seen in Fig. 9, the central cavity of the assembled valve formed by the left end of bore 232 (to the right of spring seat 254), the bore 266 of hollow valve element 234, and the internal cavity 280 of land 238, all communicate with the oil tank by way of a passage 282 which is adapted to be connected to any suitable conduit 283 (Fig. 16) by means of the threaded connection 284.

The bore 278 communicates with a passage 286 which in turn connects with another passage 288. The passage 288 communicates with the interior of the fluid connection 70, thus making the control piston 276 subject to the pressure in the connection 70.

When fluid is flowing through the pressure regulating valve 76 in a direction to bring into play the pressure regulating features of the valve, flow is into the connection 78 and out through the connection 70. Under these circumstances, the connection 78 is the intake passage and the connection 70 is the discharge passage. The two passages are connected by the bore 232 through the liner 242 by means of groove 240 of the valve element 234, when the element is biased toward its wide open position by spring 252, substantially as shown in Fig. 9. There is, however, a means other than bore 232 to communicate the passages 70 and 78. This means is best shown in Fig. 10 and includes a chamber 290. The chamber 290 is in communication with the passage 70 through the annular groove 250 and an auxiliary passage 292. The chamber 290 extends parallel to a plane passing through the axis of the valve element, but at an angle to that axis, and communicates at its other end with the annular groove 248 by means of an auxiliary passage shown in dotted lines at 294. The auxiliary passage 294 is thus in communication with the fluid connection 78 by way of the annular groove 248.

This other means communicating the connections 70 and 78 and consisting of groove 250, auxiliary passage 292, chamber 290, auxiliary passage 294, and groove 248 is provided with a check valve 296. Check valve 296 lies for the most part in the chamber 290 and is biased against a seat 298 on a valve seat insert 299 to close off passage 292 by means of a spring 300. Thus, for fluid flow from connection 78 to connection 70, the normal passage will be through the bore 232 by way of groove 240 of valve element 234 when the element is in open position or partially open position. Flow from connection 70 to connection 78 may take the same path, or it may take the other path including the chamber 290, by opening the check valve 296, in the event that valve element 234 is in its cut-off position, as will be more fully described later.

Check valve 296 is provided with a bore 301, which at its closed end provides a seat for spring 300. Spring 300 is held in spring mounting means 302 which is provided with a hollow stem 303, the spring 300 lying in the hollow 304 of stem 303. Stem 303 slidably engages bore 301 of the check valve. The left end of the hollow 304 of stem 303 provides the other seat for spring 300. The hollow stem is vented by means of passages 305 and 306 to insure against forming a closed pocket of the space that the spring lies in. Access to the check valve is provided through opening 307 by a removable cover 308.

The reversing valve

Figure 12:
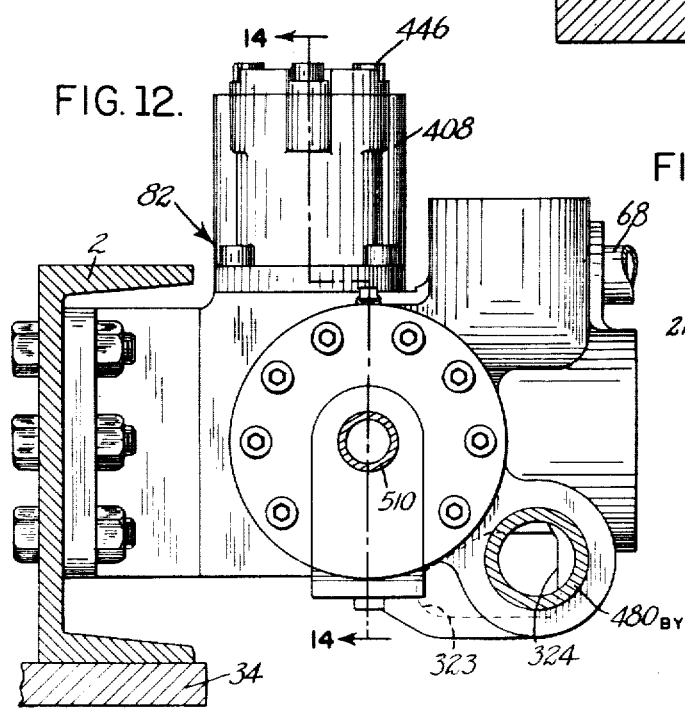
Fig. 12 is an end elevation view of the reversing valve shown without the accumulators, and, of course, being in section through various frame members of the apparatus and through certain fluid conduits.

Reference is now made to Figs. 12, 14, and 15 for a detailed discussion of the reversing valve 82. A valve body 310 is shown as being provided with a central bore 312 having a plurality of annular grooves radially outward from the central bore designated by reference numerals 314, 316, 318, 320 and 322. The groove 318 is connected to a source of fluid under high pressure and thus forms a high pressure region. The grooves 314 and 322 are connected together by passages 323, 324, and 325 (Figs. 12 and 16) and to a source of fluid under low pressure and thus form a low pressure region. The remaining grooves 316 and 320 are connected to means to utilize fluid under pressure, in this case the main drive motor of the shaker mechanism.

A spool member 326 having lands 328 and 330 at its ends and a groove 332 between the lands, is mounted for reciprocation in the bore 312. The spool member 332 could reciprocate directly on the internal surface of bore 312, but in the preferred form, the bore 312 is provided with a liner 334. Liner 334 is ported as shown at 336, 338 and 340 to communicate the liner interior with the annular grooves 316, 318 and 320 respectively.

In order that the spool may be as light as possible, it is preferably hollow, having a bore 342. Bearing or reaction members 344 are press fitted in the ends of the bore 342. Members 344 engage pistons 346 and 348 of expansible chamber motors located in the ends of the valve. Piston 346 is reciprocable in an operating cylinder 350 mounted in one end of bore 312, and piston 348 is reciprocable in an operating cylinder 352 mounted in the opposite end of bore 312. Operating cylinders 350 and 352 are provided with substantially central bores 354 which are fitted with suitable bearings 356. The actual sliding contact is between pistons 346, 348, and their respective bearings 356, 356, rather than with the internal surfaces of bores 354.

The operating cylinders 350 and 352 are provided with end caps 358 and 360. It will be noted that the complete right end of the reversing valve does not show in Fig. 14; this is done in order to show the valve on a larger scale, and because the two ends are substantially identical. Suitable threaded fluid connections, one of which is shown at 362, are adapted to receive fluid conduits to supply pressure fluid to operate the pistons 346 and 348. Between the end cap 358 and its operating cylinder 350, there is provided an orifice plate 364 having a central orifice 366. The end of piston 346 is provided with a restricting projection 368 which cooperates with the orifice 366 to restrict the passage available to fluid flowing outward when the piston 346 is moving to the left as seen in Fig. 14.

In order that the entire effective area of piston 346 may be subjected to the pressure of the hydraulic fluid at the time that pressure is supplied to the expansible chamber motor, means are provided to by-pass the restriction formed by the orifice 366 and the restricting projection 368. These means include a passage 370, a connecting passage 372, a check valve 374 and a short additional passage 376. The check valve opens only for fluid flow from the threaded connection 362 to the passage 376, as will be readily evident from an examination of the drawing to one skilled in the art. The check valve 374 includes a valve body 378 disposed in a recess 380 in the cylinder member 350, and a ball check 382 cooperating with a seat 384. Suitable passages 286 and 388, and a groove 389, are provided in the valve body 378. Access to the valve body is made possible by an opening in the cylinder member 350, which is normally closed by a plug 390.

Resilient means are provided to stop the piston 346 and spool member 326 if the hydraulic fluid resistance has not stopped them by the time the parts have reached the position shown in Fig. 14. The resilient means thus referred to consists of a coil spring 392 disposed in compression between the orifice plate 364 and a washer 394 and lying in a recess 395. The washer 394 abuts against a shoulder 396 formed at the junction of recess 395 and bore 354. A collar 398 is secured to piston 346 for engagement with washer 394, and is grooved or fluted at shown at 399 (Fig. 15) in order to permit fluid flow past the collar readily, so the collar will not act like a piston.

It will, of course, be understood by those skilled in the art that the right-hand end, as shown in Fig. 14, of reversing valve 82 is substantially identical with the left end just described. There will, accordingly, be no advantage in repeating the description as applied to the right end of the valve.

The grooves 316 and 320 are each provided with one-way valved passages communicating them with the high pressure region of the valve, which includes the groove 318. Passages 400, 402 and 404 are provided through the valve body 310 to communicate grooves 316, 318 and 320 respectively, with a chamber 406 provided in a check valve housing 408. The passages 400, 402 and 404 communicate with the chamber 406 by way of passages 410, 412 and 414, respectively, in one wall of the housing 408. In the preferred form of the invention, the passages 410 and 414 are provided with removable valve seat inserts 416 and 418 respectively. Check valves 420 and 422 seat against suitable valve seats provided in the inserts 416 and 418 respectively. Each check valve is provided with any suitable spring 424 as will be understood by those skilled in the art.

Access may be had to the check valves 420 and 422 through openings 426 and 428 in the valve housing 408. The springs 424 are preferably held in place by spring mounting means 430 and 432 disposed against shoulders 434 and 436 in recesses 438 and 440, respectively. The recesses 438 and 440 in the housing 408 are, of course, in direct communication with the openings 426 and 428 respectively, and are normally closed by caps 442 and 444 respectively, held in place by any suitable means as, for example, by screws 446.

The spring mounting means 430 and 432 are provided with tubular extensions 448 to receive springs 424 and slidably engage bores 450 in the check valves, to the end that each spring 424 is compressed between the end of bore 450 and the end of the interior of the tubular extension 448. In order that the space in which the spring 424 lies not constitute a closed pocket, a passage 452 and another passage 454 communicating therewith connect the space occupied by the spring with the chamber 406.

The hydraulic system

For a complete understanding of a description of the hydraulic system as a whole, reference is made to Fig. 16. This figure shows the cylinder 50 with piston 58 reciprocable therein and connected to piston rods 46 and 60. Cylinder heads 42 and 66 are provided at the ends of the cylinder. The fluid connection 70 connects cylinder head 66 with the pressure regulating valve 76. Conduit 68 connects cylinder head 42 with the groove 316 of reversing valve 82. Conduit 80 communicates the fluid connection 78 of valve 76 with the groove 320 of valve 82.

Hydraulic fluid is supplied to the system under high pressure by any suitable hydraulic, variable capacity pump 456 taking oil from a reservoir, tank, or sump 458 by way of an intake connection 460. The pump discharge communicates with groove 318 of valve 82 by way of a fluid conduit 462. The low pressure region of valve 82 connects with the pump intake by way of a conduit 464, reservoir 458 and the suction line 460. A pressure regulating check valve 466 is provided in the end of the return line 464 to maintain a small back pressure in the return line, in order to make the low pressure accumulator 478 effective; a pressure of from one to two atmospheres will generally suffice. The high pressure line 462 and the low pressure line 464 are cross-connected by conduits 467 and 468. These latter two conduits are provided with a needle valve 469 and a safety valve 470, respectively. In addition, if desired, a by-pass line 471 may be provided to connect high pressure line 462 directly with the tank 458. A cut-off valve 471a will be provided, and will of course be closed during operation. Valve 471a may be manually operated, or may be a solenoid-operated valve with remote control if means be desired whereby the shaker mechanism may be shut down with a minimum of delay.

The pump 456 is driven by any suitable power source such as the motor 472 shown in Fig. 16. It will, of course, be understood by those skilled in the art that motor 472 may be an electric motor, internal combustion engine, or any other sutiable source of power.

In order that the volume of oil moving between pump 456 and valve 82, and between valve 82 and tank 458, may be kept to a minimum, the valve 82 is supplied with means for accumulating hydraulic fluid at the two different required operating pressures. These two pressures are, of course, not two precise fixed values, but are in reality pressure ranges. Thus, the high pressure in the system will vary over a permissible range and the low pressure in the system will likewise vary. Any suitable means of accumulating oil under pressure in such a way as to make the oil available in substantial quantity upon demand, may be used, but a preferred form of such means is a hydraulic accumulator of the enclosed bladder type, such as is disclosed and claimed in Reissue Patent No. Re. 23,437 to Mercier.

Accordingly, the hydraulic system is provided with a high pressure accumulator and a low pressure accumulator. In actual practice, two high pressure accumulators are used to keep down the overall height of the apparatus, but it will, of course, be understood that one accumulator could be used. The two high pressure accumulators are shown at 474 in Figs. 1 and 2 and are shown as one accumulator in the operational views Figs. 16–19. The accumulators 474 are mounted on the valve in any suitable manner so as to communicate with the high pressure region, namely the groove 318. This connection of the high pressure accumulators to the valve is shown diagrammatically in the operational views by the fluid connection 476.

A low pressure accumulator 478 of the general type referred to above is connected to the valve 82 in communication with the low pressure region referred to above. This connection is shown as a conduit 480 in Figs. 12 and 16–19. In order to prevent fluid flow from the high pressure accumulators 474 back to the low pressure line by way of conduit 462 and passages 467 and 468, a check valve 482 is provided in the high pressure conduit 462, near the valve.

The pilot valve 172 may be any suitable pilot valve and is shown in detail only schematically in the operational views Figs. 16–19, wherein the valve appears to constitute a housing 484 having a central bore with a spool 486 reciprocable therein. The central bore is provided with end chambers or grooves 488 and 490 and with intermediate grooves 492, 494 and 496. In the schematic operational views, the spool is shown as being connected to end actuating rods 498 and 500. It will, of course, be understood that the two rods 498 and 500 in the actual valve will be the one operating rod connected to the link 173 (Fig. 5).

The groove 494 is always subject to the high pressure range of the system by being connected with the high pressure region of valve 82 by way of conduit 502. The two end grooves 488 and 490 are interconnected by fluid passage 504 within the valve body 484, and the passage 504 is in turn connected with the low pressure region of valve 82 by way of conduit 506.

Groove 492 of valve 172 communicates with the left-hand (as seen in Figs. 16–19) expansible chamber motor of valve 82 by way of a conduit 508. Groove 496 of valve 172 communicates with the other expansible chamber motor of valve 82 by way of a conduit 510 and the connection 362 shown in Fig. 14.

Reference is now made to Fig. 20 for a discussion of the hydraulic system which long-strokes the main drive piston 58. Fig. 3 shows a hydraulic pump unit 144 and Figs. 4 and 5 show the expansible chamber motor 180.

Fluid under a low head of pressure is made available to pump unit 144 by a fluid reservoir 512 connected to the pump cylinder 152 by way of a conduit 514 and a connection 516. Reservoir 512 has a liquid level approximately as shown at 517. The connection 516 makes a threaded connection with the threaded opening 166 of cylinder 152. A check valve 518 is provided in the conduit 514 to prevent return flow from cylinder 152 back through conduit 514. Conduit 516 communicates with the expansible chamber motor 180 by way of conduits 520 and 522. A check valve 524 is provided in the conduit 520 to prevent return flow from conduit 522 to cylinder 152. A conduit 526 connects conduit 522 with a needle valve 528, and the latter communicates with reservoir 512 by way of a conduit 530. A conduit 532, provided with a relief valve 534, connects conduit 526 with conduit 514.

*The modification of Figs. 21 and 22*

Reference is now made to Figs. 21 and 22 for a discussion of the embodiment of the invention shown therein. It will be recalled that the above introductory matter referred to the problem created by the high pressure of the hydraulic fluid as the conveyor changes from a loaded condition to a substantially unloaded condition. Fig. 20, discussed above, shows in detail one means of coping with the high pressure problem referred to. The embodiment shown in Figs. 21 and 22 shows another such means.

As shown in Fig. 21, a pump unit and its associated supply tank are shown which are substantially identical with the pump unit and supply tank shown in Fig. 20, and therefore no detailed description thereof will be provided at this point. The embodiment of Figs. 21 and 22 differs from the embodiment first described in that the new embodiment does not show mechanism for changing the timing of the period of oil admission to the main drive motor, but instead shows means for relieving the high pressure hydraulic line of its excessive pressure.

Thus, the conduit 522 is connected to a pressure responsive by-pass valve 536. By-pass valve 536 comprises a valve body 538 having a bore 540. A fluid connection 542 communicates bore 540 with conduit 522. Fluid connections 544 and 546 communicate the bore 540 with high pressure conduit 462 and low pressure conduit 464 by means of conduits 548 and 550, respectively.

A spool-type valve element 552 is reciprocably disposed in the bore 540. Valve element 552 is provided with lands 554 and 556 spaced apart by a groove portion 558. The land 554 is provided at the left end of the valve element as seen in Fig. 21, and serves also as a piston which is subjected to fluid pressure in the line 522. The opposite end of valve element 552 is subjected to any suitable resilient bias, such as that provided by a spring 560 acting through a reaction member 562.

Figure 19:
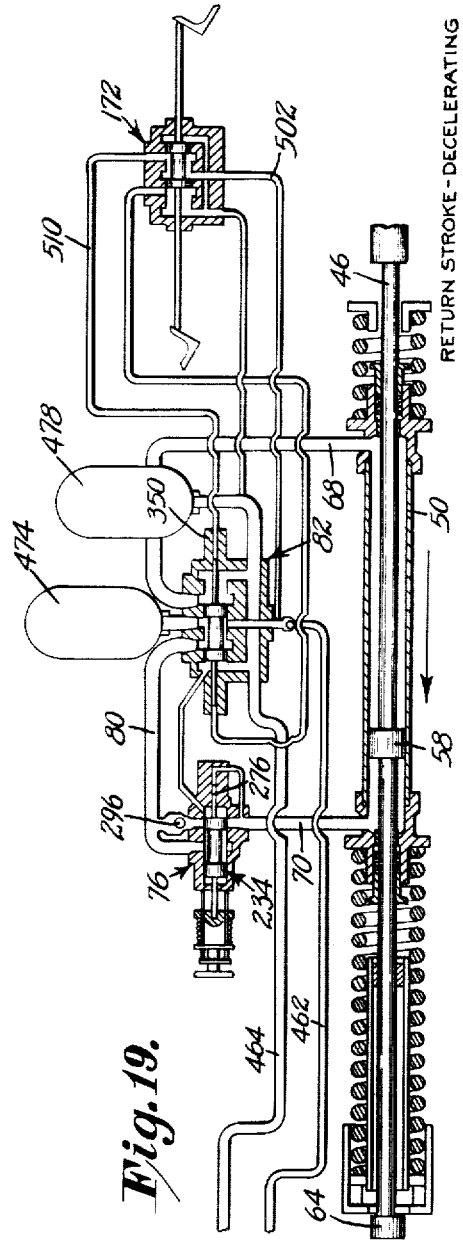
Fig. 19 is a view similar to Fig. 18, but showing the decelerating portion of the return stroke.

The application of this embodiment of the invention to the hydraulic shaker mechanism is shown schematically in Fig. 22, Fig. 22 being similar to Fig. 19 of the first embodiment. In Fig. 22, the by-pass valve 536 is shown in simplified form, and is shown connected with the high pressure conduit 462 and the low pressure conduit 464.

13

The embodiment of Figs. 23–27

Figure 23:
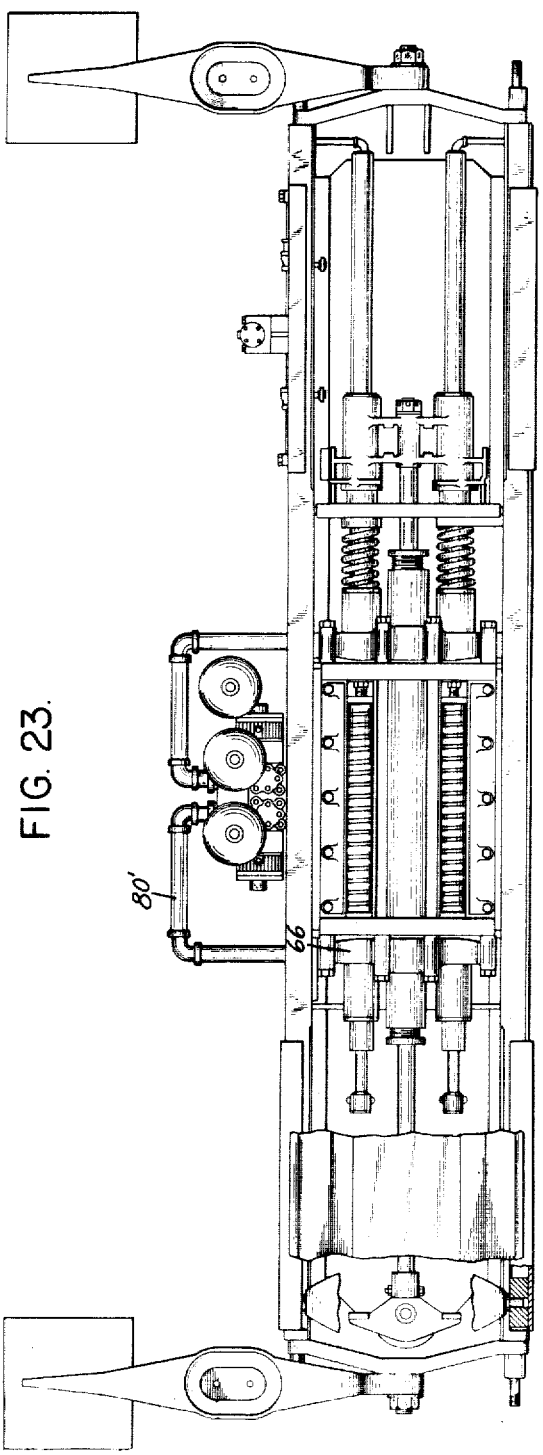
Fig. 23 is a top plan view of another embodiment of the invention, being in this respect somewhat similar to Fig. 1.
Figure 27:
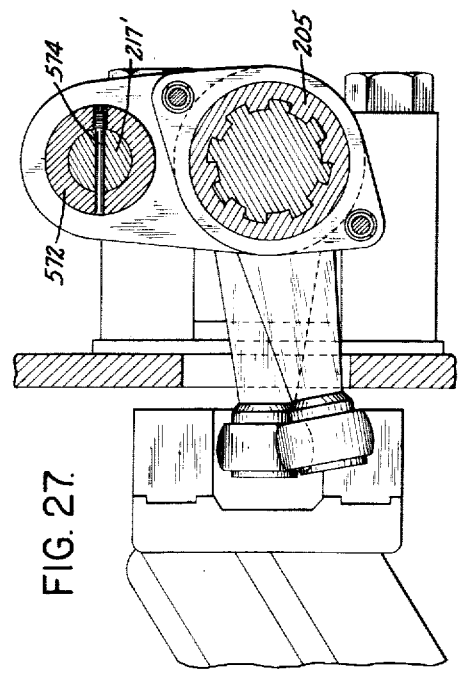
Fig. 27 is a view in section substantially on line 27—27 of Fig. 26.

Modifications of various details of the apparatus shown in Figs. 1–20 are provided in the embodiment of the invention shown in Figs. 23–27. The modification most evident from a study of Fig. 23 is the omission of the pressure reducing valve. In the embodiment shown in Fig. 23, conduit 80', which corresponds to conduit 80 of Fig. 1, goes directly to the cylinder head 66 instead of being communicated with the cylinder head through a pressure reducing valve. In many applications of a conveyor of this type, it will be found that no pressure reducing valve is necessary.

The modifications in other details of the apparatus are apparent from a detailed inspection of Figs. 24–27. Thus, the resilient connection of rod 94' with the transverse member 52 differs from the resilient connection of rod 94 in Fig. 3 with its transverse member 52. Whereas the resilient connection shown in Fig. 3 includes a resilient washer 91, in the variation or modification shown in Fig. 24, spring seat 92 abuts directly against the transverse member 52. The resilience desired in the connection is achieved in the modification shown in Fig. 24 by extending rod 94 as shown at 94x, and placing a small spring 94s between the outer face of spring seat 92 and a washer 94w at the end of extension 94x.

Figure 24:
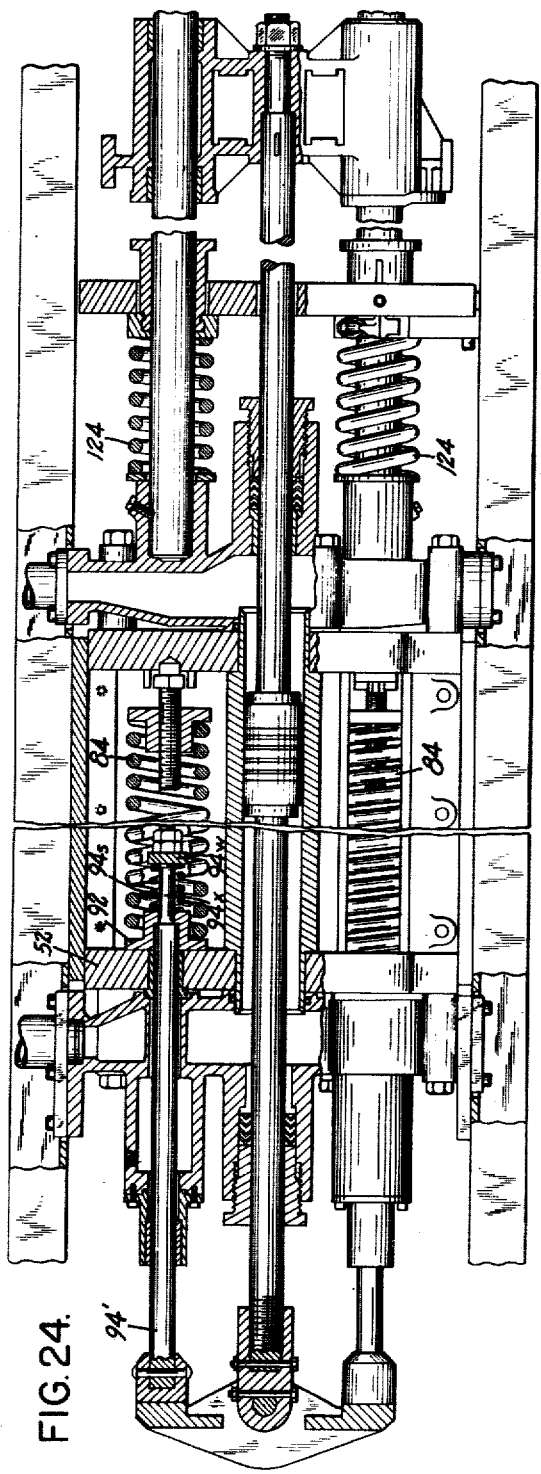
Fig. 24 is another top plan view on a larger scale of a portion of the embodiment shown in Fig. 23, with parts broken away and in section to show details of construction.

Close inspection of Fig. 24 will also bring out the complete absence of any pump device such as shown at 144 of Fig. 3. No such pump device is shown in Fig. 24 because there is no positionable trip mechanism in Fig. 24 such as appears in Figs. 3–5 and 20 of the first embodiment of the invention. The trip mechanism shown in Figs. 23–27 is not "positionable" in the sense that is meant by automatic regulation. The trip mechanism is positionable in that it can be positioned or adjusted manually while the machine is shut down.

Figure 25:
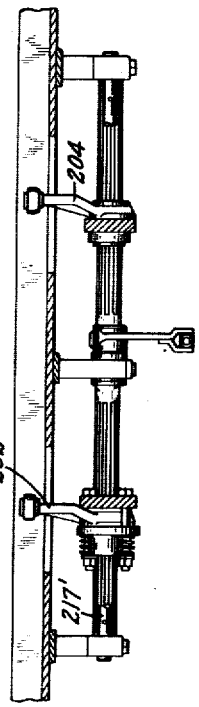
Fig. 25 is a top plan view, with parts broken away and in section, of a portion of the mechanism showing certain details of the trip mechanism for the embodiment of the invention shown in Fig. 23.
Figure 26:
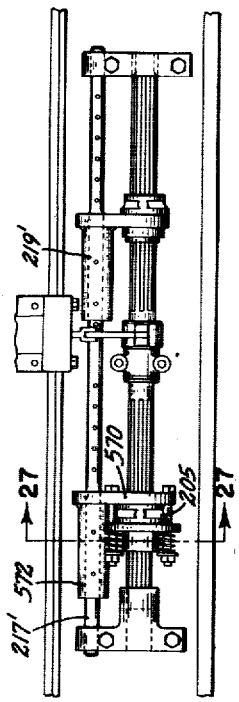
Fig. 26 is a side elevation view of the detail shown in Fig. 25.

Thus, Figs. 25 and 26 show a rod 217' similar to the rod 217 of Figs. 4 and 5 and mounted in a similar manner. However, whereas the arm 204 of Figs. 4 and 5 is mounted to be positioned by a motor device 180, the arm 204 of this embodiment is located in its axial position by a sleeve 219' which is positionable manually along the rod 217'. To permit the manual positioning referred to, sleeve 219' and rod 217' are provided with holes to receive suitable set screws, as will be understood by those skilled in the art.

It will be recalled that the arm 202 of Figs. 4 and 5 is located axially by a bracket 208. In the embodiment shown in Figs. 25 and 26, arm 202 is again mounted for manual positioning, but in this embodiment, arm 202 and its integral knob 205 have been turned end-for-end from the position shown in Figs. 4 and 5. Instead of a boss 207 being mounted adjacent hub 205 as in Figs. 4 and 5, a transverse member 570 takes its place and carries at its upper end (as seen in Fig. 26) a sleeve 572. Sleeve 572 slidingly engages the rod 217', and again sleeve 572 and rod 217' are provided with cooperating holes to receive suitable set screws, one of which is shown at 574 of Fig. 27.

OPERATION

The functioning of the system and its various parts will now be described in detail.

The main hydraulic system

For the discussion of the operation of the main hydraulic system, reference is made to Figs. 16–19. Motor 472 drives pump 456, and oil under high pressure is supplied to the high pressure region of the reversing valve 82 by way of conduit 462. The accumulators 474 are in communication with the high pressure region of the valve and are therefore charged with oil at that pressure. With the various valves in the position shown in Fig. 16, groove 320 is in communication with the high pressure region of the valve, and this connection admits oil under pressure to conduit 80 and thus to connection 78 of pressure regulating valve 76.

14

It may be noted here that the check valve by-pass from the low pressure grooves 316 and 320 of valve 82 to the high pressure region is not illustrated in the schematic views Figs. 16–19 in order to avoid unnecessary complication of those views. The operation of this by-pass is described below in connection with the description in detail of the operation of the reversing valve.

Oil flows through the pressure regulating valve 76 from connection 78 to connection 70 and appears in connection 70 at a reduced pressure. The valve 76 is so designed as to give such a pressure in the connection 70 and therefore in the cylinder 50 as will move the piston 58 at the optimum acceleration. Such an acceleration must be determined by the coefficient of friction of the coal or other mineral on the shaker pans. As a practical matter, hand wheel 256 of valve 76 is adjusted to provide maximum acceleration of the coal or other mineral without sliding thereof. Fluid at a reduced pressure, accordingly, passes through the connection 70 to the cylinder 50 and moves piston 58 to the right on the working stroke at an accelerating speed.

During this portion of the operating cycle, the pilot valve 172 is as shown in Fig. 16, in which position fluid under pressure passes from groove 494 to groove 496, through the conduit 510 and to the expansible chamber motor 350, which is shown at the left end of valve 82 as seen in Fig. 14 and at the right end of valve 82 as seen in Fig. 16. The presence of pressure in motor 350 accounts for the operating position of reversing valve 82 shown in Fig. 16.

While oil under a reduced operating pressure is being admitted to the left end of cylinder 50, oil is being discharged from the right end of the cylinder to the low pressure line 464 by way of conduit 68, groove 316 of valve 82, groove 314, and passage 323.

Reference is now made to Fig. 17 for a discussion of the next phase of operation. In Fig. 17, the piston 58 is still moving forward in the working stroke as shown by the arrow, but it is nearing the end of the working stroke. It is assumed in Fig. 17 that the pilot valve 172 has just been tripped by one of the trip mechanisms described above. With pilot valve 172 in the position shown in Fig. 17, fluid under pressure passes from groove 494 to groove 492, thence through conduit 508 and to the expansible chamber motor 352 at the left end of valve 82 as seen in Fig. 17. The presence of fluid under high pressure in the motor 352 effects movement of the spool member 326 to the right. The result of this movement is to connect groove 316 of valve 82 with the high pressure region and to connect groove 320 with the low pressure region.

It will now be observed that the cylinder portion to the right of piston 58 is in communication with high pressure accumulators 474 by way of conduit 68 and the reversing valve. It will further be recalled that piston 58 is moving toward the right. Accordingly, the right end of cylinder 50 is discharging oil under high pressure into accumulators 474 through conduit 68 and the reversing valve 82.

Inasmuch as piston 58 is moving toward the right during this phase of the operation, that portion of cylinder 50 to the left of piston 58 is, of course, increasing in volume. Oil is supplied to this portion of the cylinder from the low pressure accumulator 478 by way of passages 324 and 325 in valve 82, grooves 322 and 320 in valve 82, conduit 80, pressure reducing valve 76 and fluid connection 70. Because of the reduced pressure on control piston 276, the valve element 234 of valve 76 is in its extreme open position as shown in Fig. 17.

It will also be noted that the parts are shown in Fig. 17 in a position in which the abutment 64 is ready to compress springs 84 (shown schematically in Fig. 17 as one spring). Accordingly, as piston 58 continues to move to the right, spring 84 stores up energy as it aids in stopping the forward movement of piston 58, and thereby, of course, also the forward movemet of the pans carrying the coal or other mineral.

It will thus be seen that powerful forces are brought into play to effect a quick stopping of piston 58 in the forward stroke. One of these forces comes from the high pressure fluid operating in the right end of cylinder 50 against piston 58, and the other force comes from the compression of springs 84. The large mass of the shaker mechanism is thus brought to a smooth but quick stop.

Figure 18:
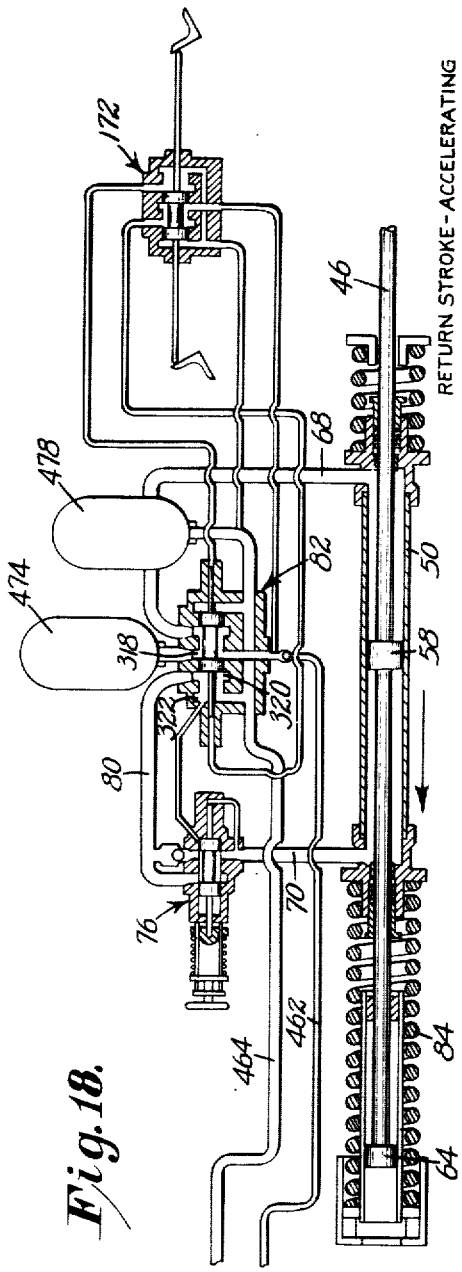
Fig. 18 is a similar diagrammatic view, but showing the parts in their relative positions for the accelerating portion of the main drive piston on the return stroke.

Reference is now made to Fig. 18, in which the pilot valve 172 occupies the same position as in Fig. 17, and therefore, of course, reversing valve 82 is also in the same operating position as in Fig. 17. Thus the right end of cylinder 50 is still subjected to the high pressure prevailing in valve 82 by way of conduit 68. The energy which was stored up in springs 84 during the latter part of the working stroke has been expended in giving the entire reciprocable mechanism a fast acceleration on the return stroke. In addition, of course, the full high pressure of the system from high pressure accumulators 474 communicates with the right end of cylinder 50. A large quantity of oil under maximum pressure is thus available to act on the right face of piston 58.

The result of the springs 84 giving up their energy and the oil under high pressure available from accumulators 474, is a rapid acceleration of piston 58 and, of course, the entire connected shaker mechanism, to the left. The quick acceleration thus provided slides the pan under the coal or other mineral which continues to move in the forward direction, namely the same direction in which it was moving in Figs. 16 and 17. Piston 58, of course, is now moving in the opposite direction as shown by the arrow in Fig. 18.

During this phase of the operation, the left end of cylinder 50 is, of course, discharging oil by way of fluid connection 70, pressure regulating valve 76, and conduit 80 to the return line 464 and also to the low pressure accumulator 478 by way of valve 82. Thus it can be seen that the low pressure accumulator serves as a reservoir close to the cylinder which requires oil during the deceleration phases of its operation and which discharges oil during acceleration, and thus obviating the use of a large capacity conduit between the valve and a remote tank.

Reference is now made to Fig. 19 for a consideration of the decelerating phase of the return stroke of piston 58. For this portion of the cycle of operation, the pilot valve 172 has just been tripped by the positionable trip mechanism into the position shown in Fig. 19. In this position, fluid under high pressure is admitted from the high pressure line 502 through the valve 172 to the conduit 510. Conduit 510 admits oil under pressure to the expansible chamber motor 350 of reversing valve 82, with the result that the reversing valve is forced leftward into the position shown in Fig. 19. With reversing valve 82 in this position, the high pressure accumulators 474 communicate by way of the reversing valve, conduit 80, pressure regulating valve 76, and fluid connection 70 with the left end of cylinder 50.

Piston 58 is moving leftward, and so, of course, the left end of cylinder 50 is discharging oil under high pressure. The high pressure now in the fluid connection 70 moves control piston 276 of the pressure regulating valve to the left, moving the valve element 234 into its cut-off position. Nevertheless, fluid under high pressure flows through pressure regulating valve 76 from the connection 70 to conduit 80 by way of the check valve 296. Thus, during the phase of operation shown in Fig. 19, the large mass of the shaker mechanism is charging the high pressure accumulators 474, and is, of course, being slowed down by the pressure exerted by those accumulators.

During this phase of the operation, the right end of cylinder 50 is increasing in volume. Oil is therefore supplied to the right end of the cylinder from low pressure accumulator 478 through valve 82 and conduit 68. When the piston 58 reaches the end of its return stroke, the cycle is ready to begin over again. Pilot valve 172 occupies a position in Fig. 16 which is the same as its position in Fig. 19. For that reason, the reversing valve occupies a position in Fig. 16 which is also the same as the position shown in Fig. 19.

It is probable that the low pressure accumulator 478 will bleed down to substantially no pressure (gage) during shutdown periods. Needle valve 469 permits quick restoration of the operating back-pressure in line 464 when the system is started up again. The back-pressure is of course determined by the pressure at which the pressure regulating check valve 466 opens.

The positionable trip mechanism

The shaker mechanism is so designed that, for normal operation (i. e., for a normal load on the shaker pans), the high pressure in the left end of cylinder 50 during the decelerating portion of the stroke is sufficient to stop the piston on its return stroke. Let it be assumed now that the shaker conveyor continues to operate during a time in which no additional coal or other mineral is loaded onto the shaker pans. The mineral already on the pans will, of course, be discharged by the moving shaker conveyor until the entire pan has been substantially emptied.

As the load on the conveyor mechanism thus lightens, the high pressure built up in accumulators 474 during loaded operation is no longer needed to move the much-reduced mass, and the shaker mechanism temporarily speeds up. Under these conditions, piston 58 will have a tendency to overtravel, i. e., move beyond its normal dead center, especially on the return stroke. Inasmuch as piston 58 is connected by way of piston rod 46 to crosshead 32, we need not here be concerned with the precise location in cylinder 50 of the normal end position of piston 58 on the return stroke, but can take the position of crosshead 32 as a reference point. Accordingly, let it be assumed that screw 190 (Figs. 4, 5 and 20) is adjusted so that the return stroke stopping point for the reciprocating parts when the conveyor is normally loaded is such as to bring the lobe 140 of crosshead 32 just barely into contact with the piston rod 142 of pump device 144. Accordingly, if there is any overtravel on the return stroke, such overtravel will push the bumper sleeves 131 and 132 leftward as seen in Fig. 3 and will compress springs 124. This compression of springs 124 stores up energy which is returned to the reciprocating parts on the next working stroke.

However, the compression of springs 124 is accompanied by another phenomenon, namely that of the lobe 140 (Fig. 3) coming into contact with the plunger or piston rod 142 of hydraulic pump 144.

Reference is now made to Fig. 20. As plunger 142 is moved leftward, it forces oil out of cylinder 152 past check valve 524 into conduit 522 and into the expansible chamber motor 180. The fluid thus delivered to the expansible chamber motor 180 causes piston 188 of motor 180 to move to the right. The rightward movement of piston 188 causes collar 200, sleeves 216 and 219, and thus trip arm 204 (Fig. 4), to move toward the right.

On the next working stroke, near the end of that stroke, the cam members 222 and 224 engage the rotor on trip arm 204 to actuate the pilot valve 172. However, because the trip arm 204 has been moved to the right by the overtravel just described, pilot valve 172 is actuated later than it was before the overtravel occurred. Thus later cut-off is effected, "using up" more pressure fluid and bringing about an automatic balance between the power requirements of the shaker conveyor and the pressure of the high pressure fluid.

The piston continues to be controlled in this manner as long as it overtravels. If normal operating conditions are quickly restored, i. e. normal load conditions return, the piston 58 ceases to overtravel. The fluid which is then remaining in the expansible chamber motor 180 is allowed to leak back to the tank 512 by way of conduit 526, needle valve 528 and conduit 530, as will be well understood by those skilled in the art. The necessary pressure to effect such return of trip arm 204 to its normal position is provided by the spring 221 operating against sleeve 219 which in turn bears against collar 200, pushing it outward and restoring the arm 204 to its previously adjusted normal operation position.

If normal operating conditions are not quickly restored, the main drive motor operates with longer admission periods for a few strokes until the excessive pressure is dissipated, whereupon overtravel ceases, and the oil in the motor 180 (Fig. 20) bleeds back as aforesaid. Thereafter, when the carrier element of the conveyor is again loaded, the main drive motor "short strokes" or "undertravels" for a few cycles, until pressure has again been built up in accumulators 474, whereupon normal operation is restored.

The pressure regulating valve

Reference is made to Figs. 9 and 10 for a discussion in detail of the operation of the pressure regulating valve. As will be understood from the above description of the operation of the main hydraulic system, normal flow of fluid on the working stroke is from the pressure connection 78 to the pressure connection 70 by way of groove 248, slots 244, groove 240, slots 246 and groove 250. The right end of control piston 276 is subject to the pressure in the connection 70 by virtue of the passages 288 and 286. This pressure is, of course, the pressure in the left end of cylinder 50, as will be readily evident by referring to Fig. 16.

Accordingly, the position of the valve element 234 is regulated in response to the pressure in the left end of cylinder 50. On the working stroke, this is the downstream pressure, because flow is toward the cylinder 50 through valve 76 during the working stroke. The regulation effected may be adjusted by changing the initial compression of spring 252, simply by turning the hand wheel 256.

During the accelerating portion of the working stroke, it is of course desirable to keep the working pressure high enough to effect rapid acceleration of piston 58, but not so high as to slide the pans under the substance being moved. Accordingly, valve 76 is designed in such a manner as to give a pressure in connection 70 adequate to the desired result. It will of course be understood by those skilled in the art that, in this phase of the operation, the valve element 234 will not occupy its wide open position; it is shown very close to its wide open position in Fig. 9. Instead, the pressure on the right end of control piston 276 will move the valve element 234 leftward to effect some throttling of the fluid as it passes through valve 76. This throttling of the fluid provides in connection 70 and in the left end of cylinder 50 a working pressure which is substantially less than the full high pressure existing in the high pressure region of the reversing valve. During the decelerating portion of the working stroke, the left end of cylinder 50 and also therefore of course the fluid connection 70 are subjected to a very low pressure. This low pressure is present also on the right end of control piston 276, with the result that spring 252 forces the valve element 234 to the extreme right into its wide open position. This position permits a maximum of fluid flow through the pressure regulating valve into cylinder 50.

During the accelerating portion of the return stroke, fluid flow through the regulating valve 76 is from the cylinder 50 to the reversing valve—in other words, the flow is reversed from what it was in the phase of operation just described. This reversal of flow will make for a somewhat higher pressure at the right end of control piston 276, but the entire valve is so designed that this slightly higher pressure is still not sufficient to accomplish any substantial movement of valve element 234 toward its cut-off position. However, during the decelerating portion of the return stroke, the left end of cylinder 50 is subjected to very high pressure, because it is then in communication with the high pressure accumulators and because cylinder 50 is discharging into those accumulators. The pressure in connection 70 is, accordingly, high and therefore the pressure on control piston 276 is high. This high pressure is sufficient to move the element 234 into complete cut-off position, whereupon fluid flows through valve 76 from connection 70 to connection 78 by opening the check valve 296. Fluid flow is then from connection 70 into groove 250, through auxiliary passage 292, past check valve 296, through chamber 290, through auxiliary passage 294, through groove 248 and into the connection 78.

It will be evident to those skilled in the art that the small control piston 276 makes it possible to use a comparatively light weight spring 252 which is easily adjusted manually. This would not be possible if the entire right end of valve element 234 were subjected to the pressure in connection 70, because then a much heavier spring 252 would be required, exerting a force of some several thousand pounds, making adjustment much more difficult.

The reversing valve

Reference is made again to Figs. 12, 14, and 15, particularly Fig. 14, for a description of the operation of reversing valve 82. It will be assumed that pressure has just been admitted to the expansible chamber motor of which the operating cylinder 352 forms a part. This pressure has acted on the piston 348 which abuts against its associated bearing member 344. Accordingly, piston 348 has moved the spool member 326 into its extreme leftward position as shown in Fig. 14.

In order for the spool member 326 to move into that position, piston 346 in the left-hand expansible chamber motor had to push the oil out of cylinder 350. It did so by forcing oil out through the orifice 366 in the orifice plate 364. As the spool member 326 and, of course, piston 346 neared the extreme left position of movement, the restricting projection 368 entered the orifice 366 and gradually throttled the oil leaving through the orifice. This throttling action served to cushion the stopping of the moving parts. If that cushioning did not suffice to stop the movement of those parts, then the collar 398 compressed the spring 392 and brought the parts to a complete stop, after which the spring returned the parts to the position shown in Fig. 14.

When the pilot valve is tripped to admit fluid under pressure to cylinder 350, it is desirable that the entire effective area of piston 346 be subjected to the pressure of the operating fluid, rather than just that portion of the projection 368 which protrudes through orifice 366. This is made possible by by-passing the restriction. The by-pass consists of passages 370 and 372, check valve 374, and passage 376. The full pressure of the operating fluid is thereby brought to bear on the entire effective area of piston 346, and the spool member 326 is moved quickly to the right.

Consider now the transition effected in the reversing valve as the spool member moves from the position shown in Fig. 18 to the position shown in Fig. 19. In Fig. 18, groove 320 of valve 82 is in communication with groove 322, just as is the case in Fig. 14. As the spool member moves from the position shown in Fig. 18 to the position shown in Fig. 19, there is certain to be a time period of short duration in which the groove 320 will be completely cut off, because the land 330 of spool member 326 will cover the ports 340 in the liner 334. The effect would be to completely seal the left end of cylinder 50. Inasmuch as piston 58 is moving very rapidly at the time that such sealing is accomplished, it could be disastrous to valve 82 or to some other portion of the hydraulic system. It is in order to prevent such damage to the system that the check valves 420 and 422 are provided. The sealing of the left end of piston 50 just referred to is prevented by check valve 422 opening in order to communicate groove 320 with the high pressure region which includes the chamber 406 of the check valve housing 408.

The embodiment of Figs. 21 and 22

It was pointed out above that a rather quick transition from a loaded carrier element or pan to an unloaded one, rapidly reducing the mass, leaves the system with an excessively high pressure in the high pressure accumulators 474, which causes temporary overspeeding and overtravel of the reciprocating parts. The overtravel can be utilized to adjust the apparatus to compensate for the changed conditions; one means therefor is shown in detail in Figs. 4, 5, and 20. An alternative means is shown in Figs. 21 and 22.

When the excessive pressure occasioned by too quick unloading causes overtravel of this embodiment, actuation of pump device 144 (Fig. 21) moves the valve element 552 against spring 560, connecting high pressure conduit 462 with low pressure conduit 464 via conduit 548, bore 540, and conduit 550. The result is what may be termed "dumping" of the high pressure accumulators, and relieving the high pressure.

The embodiment of Figs. 23–27

The considerably simplified modification shown in Figs. 23–27 operates in the same manner as the first embodiment discussed above, except for the absence of automatic pressure regulation and automatic adjustment of the trip mechanism.

Thus, in this embodiment as well as in the first one discussed, the reversing valve is tripped long before the large reciprocating mass has reached the end of a stroke. As soon as the valve is tripped, the drive motor is connected to discharge fluid to the high pressure accumulators. A twofold purpose is thereby served: bringing the heavy mass to a quick and smooth stop; and charging the accumulators to a high pressure to effect the desired acceleration at the beginning of the next stroke.

Because the acceleration on the return or idler stroke should be high enough to slide the carrier element under the mineral being conveyed, a higher acceleration is permitted than can be tolerated at the beginning of the working stroke. To provide the desired higher acceleration, heavy springs 84 are arranged to absorb some of the energy of the large mass as it is brought to a stop. Thus the springs and the high pressure accumulators store up energy in the deceleration of the mass during the working stroke. During the return stroke, the high pressure accumulators alone store up energy, unless there is overtravel, in which case springs 124 are also brought into play.

In the embodiment shown in Figs. 23–27, no adjustment of the mechanism takes place as a result of the overtravel. The drive motor merely speeds up and overtravels for a few cycles until the excessive pressure is reduced.

Manual adjustment of the trip arms 202 and 204 is provided for in this embodiment, and for many applications of the invention, such manual adjustment will be found to be entirely satisfactory.

It will be evident to those skilled in the art that I have provided a much improved shaker conveyor in which large peak power requirements are met by the application of a small fraction of the peak power, resulting in a substantial saving in equipment and power costs. Other advantages will be apparent to those skilled in the art.

Although I do not intend to be limited by these figures, I may point out here that a 26–30 inch normal operating stroke (without overtravel) has been achieved, operating at a frequency ranging between 50 and 60 strokes per minute.

While there are in this application specifically described several forms which the invention may assume in practice, it will be understood that these forms are shown for purposes of illustration, and that the invention may be modified and embodied in various other forms without departing from its spirit or the scope of the appended claims.

This application is a continuation-in-part of parent application Serial No. 150,529, filed March 18, 1950, now abandoned.

I claim:

1. In a shaker mechanism for a shaker conveyor having a large mass mounted to reciprocate through delivery and return strokes in alternation, a reversible hydraulic motor connected to reciprocate the large mass under given operating conditions with a given stroke, and a hydraulic system connected to supply fluid to and receive fluid from said motor, said system comprising means including a high pressure hydraulic accumulator and means to connect said accumulator to receive fluid from the motor upon the making of a motor stroke differing in length from said given stroke to vary the pressure of fluid distributed to said motor.

2. Shaker mechanism as set forth in claim 1 in which said motor means includes a double-acting hydraulic cylinder and piston mechanism and a reversing valve connected to opposite ends of said cylinder and piston mechanism and to said fluid source.

3. Mechanism as in claim 2, in which the discharge to the accumulator takes place through the reversing valve.

4. Shaker mechanism as in claim 3, in which a pressure reducing valve is arranged between said reversing valve and one end of said cylinder and piston mechanism.

5. Shaker mechanism as in claim 4, in which said reversing valve also controls venting of the opposite ends of said cylinder and piston mechanism and in which said pressure reducing valve is controlled by the pressure between said reversing valve and said one end of said cylinder and piston mechanism and provides free venting during said at least one stroke between the end of said cylinder and piston mechanism not discharging to the accumulator.

6. Shaker mechanism as in claim 2, in which a pressure reducing valve is arranged between said reversing valve and one end of said cylinder and piston mechanism.

7. In a shoulder mechanism for a hydraulic shaker conveyor, a double-acting hydraulic motor having opposite ends and adapted under given operating conditions to reciprocate with a given stroke, means to supply hydraulic fluid under pressure to the motor and to receive fluid from the motor, said motor having distributing valve means for connecting its opposite ends alternately one to said hydraulic fluid supply means and the other to said fluid receiving means, and means, operable upon the making of a motor stroke differing in length from said given stroke, to vary the pressure of the fluid distributed alternately to the opposite ends of said motor by said distributing valve means.

8. Mechanism as in claim 7, in which the last-named means includes a separate hydraulic circuit having a pump and a motor, the pump being actuable upon the making by said double acting hydraulic motor of a stroke differing in length from said given stroke, as aforesaid.

9. Mechanism as in claim 8, in which the pump is of the expansible chamber type.

10. Mechanism as in claim 7, in which the last-named means includes an expansible chamber device supplied with fluid by said pump.

11. Mechanism as in claim 7, in which the fluid supply means has a supply conduit connected with it and the fluid receiving means has a return conduit connected with it; and in which the pressure varying means includes means to conduct fluid from the supply conduit to the return conduit.

12. Mechanism as in claim 8, in which the fluid supply means has a supply conduit connected with it and the fluid receiving means has a return conduit connected with it; and in which the pressure varying means includes means to conduct fluid from the supply conduit to the return conduit.

13. Mechanism as in claim 10, in which the fluid supply means has a supply conduit connected with it and the fluid receiving means has a return conduit connected with it; and in which the pressure varying means includes means to conduct fluid from the supply conduit to the return conduit.

14. In a shaker mechanism for a hydraulic shaker conveyor, a double-acting hydraulic motor having opposite ends and adapted under given operating conditions to reciprocate with a given stroke, means to supply hydraulic fluid under pressure to the motor and to receive fluid from the motor, said motor having distributing valve means for connecting its opposite ends alternately one to said hydraulic fluid supply means and the other to said fluid receiving means, and means, operable upon the making of a motor stroke differing in length from said given stroke, to vary the quantity of fluid admitted to the motor by said distributing valve means.

15. Mechanism as in claim 14, in which the quantity varying means includes means to vary the length of time between shiftings of fluid supply by said distributing valve means.

16. Mechanism as in claim 15, in which the distributing valve means has controlling means including a pair of spaced trip devices, the time varying means including means to vary the space between the trip devices.

17. In a shaker mechanism for a hydraulic shaker conveyor having a conveyor element reciprocable through a normal range in a working stroke and a return stroke, a hydraulic conveyor element reciprocating motor, means, including a reversing valve, to supply fluid under pressure to the hydraulic motor and receive spent fluid from the hydraulic motor, means to reverse the reversing valve before the reciprocable conveyor element reciprocating motor reaches the end of a stroke, resilient means connected to store up energy during the latter part of each working stroke, and normally inoperative safety yieldable means connected to absorb energy upon movement of the reciprocable conveyor element reciprocating motor beyond a predetermined point in the return stroke.

18. In a shaker mechanism for a hydraulic shaker conveyor having a conveyor element reciprocable through a normal range in a working stroke and a return stroke, a hydraulic conveyor element reciprocating motor, means, including a reversing valve, to supply fluid under pressure to the hydraulic motor and receive spent fluid from the hydraulic motor, means to reverse the reversing valve before the reciprocable conveyor element reciprocating motor reaches the end of a stroke, resilient means connected to store up energy during the latter part of each stroke after reversal of the reversing valve, and normally inoperative safety yieldable means connected to absorb energy upon movement of the reciprocable conveyor element reciprocating motor beyond a predetermined point in the return stroke.

19. In a shaker mechanism for a hydraulic shaker conveyor having a conveyor element reciprocable through a normal range in a working stroke and a return stroke, a hydraulic conveyor element reciprocating motor, means, including a reversing valve, to supply fluid under pressure to the hydraulic motor and receive spent fluid from the hydraulic motor, a pair of operating motors associated with the reversing valve, a pilot valve connected to admit fluid under pressure alternately to the operating motors, means to actuate the pilot valve before the reciprocable conveyor element reciprocating motor reaches the end of a stroke, resilient means connected to store up energy during the latter part of each stroke after actuation of the pilot valve, and normally inoperative safety yieldable means connected to absorb energy upon movement of the reciprocable conveyor element reciprocating motor beyond a predetermined point in the return stroke.

20. In a shaker mechanism for a hydraulic shaker conveyor having a conveyor element reciprocable through a normal range in a working stroke and a return stroke, a hydraulic conveyor element reciprocating motor, means, including a reversing valve, to supply fluid under pressure to the hydraulic motor and receive spent fluid from the hydraulic motor, a pair of operating motors associated with the reversing valve, a pilot valve connected to admit fluid under pressure alternately to the operating motors, means to actuate the pilot valve before the reciprocable conveyor element reciprocating motor reaches the end of a stroke, resilient means connected to store up energy during the latter part of each working stroke, and normally inoperative safety yieldable means connected to absorb energy upon movement of the reciprocable conveyor element reciprocating motor beyond a predetermined point in the return stroke.

21. In a shaker mechanism for a hydraulic shaker conveyor having a reciprocable element: a hydraulic motor connected to reciprocate said element through a working stroke and a return stroke, said element being adapted for normal operation to move not beyond a predetermined point on its return stroke; means to supply fluid to and receive fluid from the motor, including a reversing valve; means actuated by the reciprocable element to reverse the reversing valve, including a positionable trip mechanism; and means operable upon the element thus moving beyond said predetermined point to reposition said trip mechanism to change the time of reversal of the reversing valve on the next stroke.

22. Mechanism as in claim 21, in which the trip mechanism includes an expansible chamber motor and a trip arm located by the expansible chamber motor.

23. Mechanism as in claim 22, in which the reversing valve includes opposed expansible chamber motors, said reversing means including also a pilot valve and means to supply fluid pressure connected to admit fluid to said opposed motors.

24. In a shaker mechanism for a hydraulic shaker conveyor having a reciprocable element: a hydraulic motor connected to reciprocate said element through a working stroke and a return stroke; yieldable means connected to stop the travel of the element on its return stroke after movement of the element beyond a predetermined point; means to supply fluid to and receive fluid from the motor, including a reversing valve having a pair of opposed expansible chamber motors connectible to receive operating fluid; a pilot valve movable to a plurality of operating positions to connect said opposed motors alternately to receive operating fluid; a positionable trip mechanism actuated by the reciprocating element to move the pilot valve to its operating positions; and means operable upon movement of the element beyond said predetermined point to reposition the trip mechanism to change the time of operation of the pilot valve on the next stroke.

25. Mechanism as in claim 24, in which the trip mechanism includes an expansible chamber motor and a trip arm mounted for movement in accordance with movement of the expansible chamber motor, the last-named means including a pump connected to supply fluid to the expansible chamber motor.

26. Mechanism as in claim 25, in which the trip mechanism includes a rock shaft, the trip arm being carried by the rock shaft non-rotatably with respect thereto and longitudinally movable relative thereto, the expansible chamber motor of the trip mechanism being connected to effect said longitudinal movement.

27. In a shaker mechanism for a hydraulic shaker conveyor having an element reciprocable through a working stroke and a return stroke; yieldable means connected to stop the travel of the element on its return stroke upon movement of the element beyond a predetermined point; a hydraulic motor connected to reciprocate the element; means to supply fluid to and receive fluid from the motor, including a reversing valve; a rock shaft; a pilot valve actuator on the rock shaft and connected with the pilot valve to actuate it; a pair of trip arms carried by the rock shaft, at least one of said arms being longitudinally movable relative to the rock shaft and both being non-rotatable with respect thereto; an expansible chamber motor associated with said at least one trip arm to effect longitudinal movement of the arm on the rock shaft; cam means actuable by reciprocation of the element and engageable with said trip arms to rock the rock shaft; and fluid pump means operable upon movement of the element beyond said predetermined point to supply fluid under pressure to the expansible chamber motor to change the time of operation of the pilot valve on the next stroke.

28. A conveyor shaker mechanism comprising: a hydraulic motor, a conveyor element connected to be reciprocated by the motor through a working stroke and a return stroke, a source of hydraulic fluid under pressure, a reversing valve, a pressure regulating valve which is responsive to discharge pressure, means to conduct fluid under pressure from said source to the reversing valve, an accumulator connected to the valve at a point that is always in communication with the last-named means, means to conduct fluid from the reversing valve back to the source, conduit means connecting the reversing valve with the motor to receive fluid therefrom on the working stroke and admit fluid thereto on the return stroke, means including the regulating valve to connect the reversing valve with the motor to admit fluid thereto at a regulated pressure on the working stroke and receive fluid therefrom on the return stroke, means associated with the regulating valve to permit substantially unimpeded flow of fluid from the motor to the reversing valve, means actuated by the reciprocating element to reverse the reversing valve, yieldable means associated with the element to help stop the element upon movement thereof beyond a predetermined point, and means operable upon movement of the element beyond said predetermined point to cause the reversing means to reverse the reversing valve at a different point in a subsequent stroke of the element.

29. Shaker mechanism for a hydraulic shaker conveyor comprising a double-acting hydraulic cylinder and piston mechanism, a source of fluid under pressure including a constantly running pump and an accumulator connected at all times to the pump discharge, said cylinder and piston mechanism having a distributing valve to connect the source alternately with its opposite ends, means for moving said distributing valve in such relation to at least one stroke of said cylinder and piston mechanism that there is established a connection for the supply of fluid from the source to effect the opposite stroke before said at least one stroke is completed, whereby the completion of said one stroke is attended by the displacement of fluid against source pressure to the accumulator, said distributing valve having means for throwing it by fluid under pressure including means providing for the immediate action of fluid on a relatively large area to provide a throwing force and means providing for a progressively restricted venting of fluid to provide a cushioned completion of throwing.

30. Shaker mechanism for a hydraulic shaker conveyor including a double-acting cylinder and piston mechanism constituting a reciprocating conveyor actuating motor, a source of fluid under pressure, conduits connected with said cylinder and piston mechanism at points to which alternate fluid supply will effect the opposite strokes of said motor, distributing valve means for connecting said source with said conduits in alternation before the ends of the strokes of said motor, said distributing valve means movable to control ports connected with said conduits and effecting communication between said source and each of said conduits through said ports only after passing through a position in which said distributing valve means occludes said ports, said conduits having check valve controlled passages leading to said source for the release of fluid when said ports are occluded.

References Cited in the file of this patent
UNITED STATES PATENTS

| | | |
|---|---|---|
| 1,714,545 | Burns | May 28, 1929 |
| 2,021,066 | Huxford et al. | Nov. 12, 1935 |
| 2,141,703 | Bays | Dec. 27, 1938 |
| 2,214,755 | Tafel | Sept. 17, 1940 |
| 2,240,011 | Casey | Apr. 29, 1941 |
| 2,282,977 | Mast | May 12, 1942 |
| 2,293,118 | Cumming | Aug. 18, 1942 |
| 2,572,748 | Noll et al. | Oct. 23, 1951 |
| 2,614,388 | Miller | Oct. 21, 1952 |
| 2,663,143 | Joy | Dec. 22, 1953 |

FOREIGN PATENTS

| | | |
|---|---|---|
| 296,090 | Great Britain | Apr. 25, 1929 |
| 485,690 | Great Britain | May 24, 1938 |

UNITED STATES PATENT OFFICE
CERTIFICATE OF CORRECTION

Patent No. 2,802,336                                              August 13, 1957

Charles F. Ball

It is hereby certified that error appears in the printed specification of the above numbered patent requiring correction and that the said Letters Patent should read as corrected below.

Column 9, line 75, after "384" strike out the comma and insert instead a period; column 10, line 1, for "passages 286" read -- passages 386 --; column 20, line 50, for "shoulder" read -- shaker --.

Signed and sealed this 26th day of November 1957.

(SEAL)

Attest:

KARL H. AXLINE
Attesting Officer

ROBERT C. WATSON
                                                                                      Commissioner of Patents